(12) United States Patent
Brzeski et al.

(10) Patent No.: US 12,263,708 B2
(45) Date of Patent: Apr. 1, 2025

(54) VEHICLE ADAPTIVE RIDE HEIGHT SYSTEM AND METHOD OF CONTROLLING A VEHICLE

(71) Applicant: Harley-Davidson Motor Company Group, LLC, Milwaukee, WI (US)

(72) Inventors: Michael Robert Brzeski, Brookfield, WI (US); Mark Gene Hutchison, Vernon, WI (US)

(73) Assignee: Harley-Davidson Motor Company, Inc., Milwaukee, WI (US)

( * ) Notice: Subject to any disclaimer, the term of this patent is extended or adjusted under 35 U.S.C. 154(b) by 208 days.

(21) Appl. No.: 17/676,587

(22) Filed: Feb. 21, 2022

(65) Prior Publication Data

US 2022/0266647 A1 Aug. 25, 2022

Related U.S. Application Data

(60) Provisional application No. 63/152,002, filed on Feb. 22, 2021.

(51) Int. Cl.
*B60G 17/016* (2006.01)
*B60G 17/019* (2006.01)

(52) U.S. Cl.
CPC ... *B60G 17/0164* (2013.01); *B60G 17/01908* (2013.01); *B60G 2300/12* (2013.01); *B60G 2400/10* (2013.01); *B60G 2400/204* (2013.01); *B60G 2400/52* (2013.01); *B60G 2400/61* (2013.01); *B60G 2600/182* (2013.01); *B60G 2800/914* (2013.01)

(58) Field of Classification Search
CPC ........ B60G 2800/914; B62K 2025/044; B62K 2025/045
See application file for complete search history.

(56) References Cited

U.S. PATENT DOCUMENTS

| | | | | |
|---|---|---|---|---|
| 9,637,196 | B2* | 5/2017 | Murakami | B60G 17/0565 |
| 10,071,785 | B2* | 9/2018 | Ginther | B62K 25/04 |
| 11,713,093 | B2* | 8/2023 | Ericksen | B60G 21/08 |
| | | | | 280/124.157 |
| 2013/0336090 | A1* | 12/2013 | Tran | B60G 17/01908 |
| | | | | 367/13 |
| 2015/0239523 | A1* | 8/2015 | Ginther | B60G 17/018 |
| | | | | 701/1 |
| 2020/0070613 | A1* | 3/2020 | Tokuhara | B60G 15/062 |
| 2020/0094645 | A1* | 3/2020 | Edren | B60G 17/018 |
| 2020/0171906 | A1* | 6/2020 | Murakami | B62K 25/04 |
| 2020/0171909 | A1* | 6/2020 | Murakami | B60G 17/08 |
| 2020/0247498 | A1* | 8/2020 | Yamamoto | B62J 50/22 |

\* cited by examiner

*Primary Examiner* — Sizo B Vilakazi
(74) *Attorney, Agent, or Firm* — Jordan IP Law, LLC

(57) ABSTRACT

One or more example vehicle adaptive ride height (ARH) systems to provide semi-active damping and ARH functionality. Each example ARH system is operable to dynamically control the vehicle, in response to dynamic detection of one or more operational parameters, between a raised vehicle state or position (e.g., ride height) and a lowered vehicle state or position. Such dynamic control facilitates greater reach-to-ground when in the lowered vehicle state and automatically controls vehicle ride height when in the raised vehicle state for dynamic loading conditions.

17 Claims, 19 Drawing Sheets

VEHICLE ADAPTIVE RIDE HEIGHT SYSTEM AND METHOD OF CONTROLLING A VEHICLE

CROSS-REFERENCE TO RELATED APPLICATIONS

The present application claims the benefit of U.S. Provisional Patent Application Ser. No. 63/152,002 (filed on Feb. 22, 2021), which is hereby incorporated by reference in its complete entirety.

TECHNICAL FIELD

One or more embodiments relate generally to a vehicle, such as, for example, a motorcycle, a front suspension comprising a spring component, a front damping component, and a front adaptive ride height (ARH) system, a rear suspension comprising a spring component, a rear damping component, and a rear ARH system, a computer-implemented method of controlling a vehicle, and a computer program product for operating a vehicle.

BACKGROUND

ARH systems having manual control result in an inability of a vehicle user, operator, or rider to configure preload precisely for a specific vehicle loading condition, thereby resulting in reduced ride quality.

Moreover, existing ARH systems obtain adjustments of the seat height, for example, lowering of the seat height, through seat foam reduction or reduced suspension travel, both of which result in reduced ride comfort/quality.

Existing electronic and electro-hydraulic preload control systems use only a single channel to detect rear suspension position, or require an actuator for rear preload position and a fixed front preload position. Such ARH systems also require use of an electric motor as a power source to generate movement of the suspension system.

There are existing air systems that change vehicle ride height by activating a handlebar switch independent of vehicle condition (i.e., not activated seamlessly based on vehicle speed, vehicle acceleration rate, or other vehicle operating parameters). Such a system requires energizing an air compressor, that needs to be packaged within the system.

BRIEF SUMMARY

In accordance with one or more embodiments, an example vehicle ARH system is provided to enhance ride comfort, pitch/jounce control, and roll control (e.g., for three-wheeled vehicles).

In accordance with one or more embodiments, an example vehicle ARH system for a vehicle having a vehicle structure supported by a suspension system on a road surface is provided. The vehicle ARH system may comprise one or more of the following: a vehicle ARH control module, comprising one or more processors to execute a set of instructions to dynamically: execute a damping analysis and a vehicle attitude analysis of sensor data relating to operational parameters of the vehicle; and simultaneously control, in response to the damping analysis and the vehicle attitude analysis, the front suspension and the rear suspension to cause movement of the vehicle structure, relative to the road surface, between a lowered state and a raised state.

In accordance with the example vehicle ARH system, the vehicle ARH system further comprises a sensor module, operatively connected to the vehicle ARH control module, the sensor module comprising one or more sensors to dynamically detect as the sensor data the operational parameters of the vehicle.

In accordance with the example vehicle ARH system, the operational parameters comprise one or more of: a current position of a front suspension of the suspension system, a current preload of the front suspension, a current position of a rear suspension of the suspension system, and a current preload of the rear suspension.

In accordance with the example vehicle ARH system, the operational parameters comprise one or more of a current vehicle speed and a current vehicle acceleration.

In accordance with the example vehicle ARH system, the operational parameters comprise one or more of a current applied torque on the front brake and a current applied torque on the rear brake.

In accordance with the example vehicle ARH system, the operational parameters comprise one or more of a current tire pressure of a front wheel of the vehicle and a current tire pressure of a rear wheel of the vehicle.

In accordance with one or more embodiments, an example vehicle may comprise one or more of the following: a vehicle structure; a suspension system to support the vehicle structure on a support surface; and vehicle ARH system having a vehicle ARH control module, comprising one or more processors to execute a set of instructions to dynamically: execute a damping analysis and a vehicle attitude analysis of sensor data relating to operational parameters of the vehicle; and simultaneously control, in response to the damping analysis and the vehicle attitude analysis, the front suspension and the rear suspension to cause movement of the structure, relative to the road surface, between a lowered state and a raised state.

In accordance with the example vehicle, the vehicle ARH system further comprises a sensor module, operatively connected to the vehicle ARH control module, the sensor module comprising one or more sensors to dynamically detect as the sensor data the operational parameters of the vehicle.

In accordance with the example vehicle, the operational parameters comprise one or more of: a current position of a front suspension of the suspension system, a current preload of the front suspension, a current position of a rear suspension of the suspension system, and a current preload of the rear suspension.

In accordance with the example vehicle, the operational parameters comprise one or more of a current vehicle speed and a current vehicle acceleration.

In accordance with the example vehicle, the operational parameters comprise one or more of a current applied torque on the front brake and a current applied torque on the rear brake.

In accordance with the example vehicle, the operational parameters comprise one or more of a current tire pressure of a front wheel of the vehicle and a current tire pressure of a rear wheel of the vehicle.

In accordance with one or more embodiments, an example computer-implemented method of controlling a vehicle having a vehicle structure supported by a suspension system on a road surface may comprise one or more of the following: dynamically detecting as sensor data one or more operation parameters of the vehicle; dynamically executing, in response to the detection, a damping analysis and a vehicle attitude analysis of the sensor data; and dynamically simultaneously control, in response to the damping analysis and the vehicle attitude analysis, the front suspension and the rear suspension to cause movement of the vehicle structure, relative to the road surface, between a lowered state and a raised state.

In accordance with the example computer-implemented method, the operational parameters comprise one or more of: a current position of a front suspension of the suspension system, a current preload of the front suspension, a current position of a rear suspension of the suspension system, and a current preload of the rear suspension.

In accordance with the example computer-implemented method, the operational parameters comprise one or more of a current vehicle speed and a current vehicle acceleration.

In accordance with the example computer-implemented method, the operational parameters comprise one or more of a current applied torque on the front brake and a current applied torque on the rear brake.

In accordance with the example computer-implemented method, the operational parameters comprise one or more of a current tire pressure of a front wheel of the vehicle and a current tire pressure of a rear wheel of the vehicle. 555

In accordance with one or more embodiments, an example vehicle ARH system is provided for a vehicle having a vehicle structure supported by a suspension system. The example vehicle ARH system may comprise one or more of the following: a sensor module, operatively connected to the vehicle ARH control module, the sensor module comprising one or more sensors to dynamically detect as sensor data a current position of a front suspension of the suspension system, a current position of the rear suspension of the suspension system, a current preload of the front suspension, and a current preload of the rear suspension; and a vehicle ARH control module, comprising one or more processors coupled to the sensor module. The processors are operable to execute a set of instructions to dynamically: execute, in response to the detection, a damping analysis and a vehicle attitude analysis of the sensor data; and control, in response to the damping analysis and the vehicle attitude analysis, the front suspension and the rear suspension to move the structure between a lowered state/position and a raised state/position.

In accordance with one or more embodiments, an example vehicle ARH system is provided for a vehicle having a structure (e.g., chassis, frame, subframe, body, etc.) supported by a suspension system. The example vehicle ARH system may comprise one or more of the following: a sensor module, comprising one or more sensors to dynamically detect as sensor data a current position of a front suspension of the suspension system, a current position of the rear suspension of the suspension system, a current preload of the front suspension, and a current preload of the rear suspension; and a vehicle ARH control module, comprising one or more processors coupled to the sensor module. The processors are operable to execute a set of instructions to dynamically: execute, in response to the detection, a damping analysis and a vehicle attitude analysis of the sensor data; and adjust, in response to the analysis, the vehicle attitude (e.g., at rest states of the vehicle and during operation of the vehicle).

In accordance with one or more embodiments, an example vehicle ARH system is provided for a vehicle having a structure (e.g., chassis, frame, subframe, body, etc.) supported by a suspension system. The example vehicle ARH system may comprise one or more of the following: a user interface, to permit a vehicle operator input of a predetermined vehicle riding mode among a plurality of predetermined vehicle riding modes, each predetermined vehicle riding mode having a corresponding damping profile; a sensor module, comprising one or more sensors to dynamically detect as sensor data a current position of a front suspension of the suspension system, a current position of the rear suspension of the suspension system, a current preload of the front suspension, and a current preload of the rear suspension; and a vehicle ARH control module, comprising one or more processors coupled to the sensor module and the user interface. The processors are operable to execute a set of instructions to dynamically: execute, in response to the detection, a damping analysis and a vehicle attitude analysis of the sensor data; and control, in response to the selected predetermined vehicle riding mode, the damping analysis, and the vehicle attitude analysis, the front suspension and the rear suspension to move the structure between a lowered state/position and a raised state/position.

In accordance with one or more embodiments, an example vehicle ARH system is provided for a vehicle having a structure (e.g., chassis, frame, subframe, body, etc.) supported by a suspension system. The example vehicle ARH system may comprise one or more of the following: a user interface, to permit a vehicle operator input of a predetermined vehicle riding mode among a plurality of predetermined vehicle riding modes, each predetermined vehicle riding mode having a corresponding damping profile; a sensor module, comprising one or more sensors to dynamically detect as sensor data a current position of a front suspension of the suspension system, a current position of the rear suspension of the suspension system, a current preload of the front suspension, and a current preload of the rear suspension; and a vehicle ARH control module, comprising one or more processors coupled to the sensor module and the user interface. The processors are operable to execute a set of instructions to dynamically: execute, in response to the detection, a damping analysis and a vehicle attitude analysis of the sensor data; and adjust, in response to the selected predetermined vehicle riding mode and the analysis, the vehicle attitude through the dynamic control of the front suspension and the rear suspension (e.g., at rest states of the vehicle and during operation of the vehicle).

In accordance with one or more embodiments, an example vehicle ARH system is provided for a vehicle having a structure (e.g., chassis, frame, subframe, body, etc.) supported by a suspension system. The example vehicle ARH system may comprise one or more of the following: a sensor module, comprising one or more sensors to dynamically detect as sensor data a current vehicle speed, a current position of a front suspension of the suspension system, a current position of the rear suspension of the suspension system, a current preload of the front suspension, and a current preload of the rear suspension; and a vehicle ARH control module, comprising one or more processors coupled to the sensor module. The processors are operable to execute a set of instructions to dynamically: execute, in response to the detection, a damping analysis and a vehicle attitude analysis of the sensor data; and control, in response to the detected current vehicle speed, the damping analysis and the vehicle attitude analysis, the front suspension and the rear suspension to move the structure between a lowered state/position and a raised state/position.

In accordance with one or more embodiments, an example computer program product is provided for a vehicle having a structure (e.g., chassis, frame, subframe, body, etc.) supported by a suspension system. The example computer program product includes at least one computer readable medium comprising a set of instructions, which when executed by one or more processors, cause the one or more processors to dynamically perform one or more of the following: detect a current position of a front suspension of the suspension system, a current position of the rear suspension of the suspension system, a current preload of the front suspension, and a current preload of the rear suspension; execute, in response to the detection, a damping analysis and a vehicle attitude analysis; and control, in response to the damping analysis and the vehicle attitude analysis, the front suspension and the rear suspension to move the structure between a lowered state/position and a raised state/position.

In accordance with one or more embodiments, an example computer program product is provided for a vehicle having a structure (e.g., chassis, frame, subframe, body, etc.) supported by a suspension system. The example computer program product includes at least one computer readable medium comprising a set of instructions, which when executed by one or more processors, cause the one or more processors to dynamically perform one or more of the following: detect a current position of a front suspension of the suspension system, a current position of the rear suspension of the suspension system, a current preload of the front suspension, and a current preload of the rear suspension; execute, in response to the detection, a damping analysis and a vehicle attitude analysis; and adjust, in response to the analysis, the vehicle attitude through the dynamic control of the front suspension and the rear suspension.

In accordance with one or more embodiments, an example computer program product is provided for a vehicle having a structure (e.g., chassis, frame, subframe, body, etc.) supported by a suspension system. The example computer program product includes at least one computer readable medium comprising a set of instructions, which when executed by one or more processors, cause the one or more processors to dynamically perform one or more of the following: detect a current position of a front suspension of the suspension system, a current position of the rear suspension of the suspension system, a current preload of the front suspension, and a current preload of the rear suspension; execute, in response to the detection and the one or more vehicle operator selectable inputs, damping analysis and vehicle attitude analysis; and control, in response to (i) a selected predetermined vehicle riding mode having a corresponding damping profile, (ii) the damping analysis, and (iii) the vehicle attitude analysis, the front suspension and the rear suspension to move the structure between a lowered state/position and a raised state/position.

In accordance with one or more embodiments, an example computer program product is provided for a vehicle having a structure (e.g., chassis, frame, subframe, body, etc.) supported by a suspension system. The example computer program product includes at least one computer readable medium comprising a set of instructions, which when executed by one or more processors, cause the one or more processors to dynamically perform one or more of the following: detect a current position of a front suspension of the suspension system, a current position of the rear suspension of the suspension system, a current preload of the front suspension, and a current preload of the rear suspension; execute, in response to the detection and the one or more vehicle operator selectable inputs, damping analysis and vehicle attitude analysis; and adjust, in response to (i) a selected predetermined vehicle riding mode having a corresponding damping profile, (ii) the damping analysis, and (iii) the vehicle attitude analysis, the vehicle attitude through the dynamic control of the front suspension and the rear suspension.

In accordance with one or more embodiments, an example computer program product is provided for a vehicle having a structure (e.g., chassis, frame, subframe, body, etc.) supported by a suspension system. The example computer program product includes at least one computer readable medium comprising a set of instructions, which when executed by one or more processors, cause the one or more processors to dynamically perform one or more of the following: detect a current vehicle speed, a current position of a front suspension of the suspension system, a current position of the rear suspension of the suspension system, a current preload of the front suspension, and a current preload of the rear suspension; and a vehicle ARH control module; execute, in response to the detection, damping analysis and vehicle attitude analysis of the sensor data; and control, in response to (i) the detected current vehicle speed, (ii) the damping analysis, and (iii) the vehicle attitude analysis, the front suspension and the rear suspension to move the structure between a lowered state/position and a raised state/position.

In accordance with one or more embodiments, an example computer-implemented method of controlling a vehicle may comprise one or more of the following: dynamically detecting a current position of a front suspension of the suspension system, a current position of the rear suspension of the suspension system, a current preload of the front suspension, and a current preload of the rear suspension; dynamically executing, in response to the detection, damping analysis and vehicle attitude analysis; and dynamically controlling, in response to the damping analysis and the vehicle attitude analysis, the front suspension and the rear suspension to move the structure between a lowered state/position and a raised state/position.

In accordance with one or more embodiments, an example method of controlling a vehicle may comprise one or more of the following: dynamically detecting a current position of a front suspension of the suspension system, a current position of the rear suspension of the suspension system, a current preload of the front suspension, and a current preload of the rear suspension; dynamically executing, in response to the detection, damping analysis and vehicle attitude analysis; and dynamically adjusting, in response to the analysis, the vehicle attitude through the dynamic control of the front suspension and the rear suspension.

In accordance with one or more embodiments, an example method of controlling a vehicle may comprise one or more of the following: dynamically detecting a current position of a front suspension of the suspension system, a current position of the rear suspension of the suspension system, a current preload of the front suspension, and a current preload of the rear suspension; dynamically executing, in response to the detection and the one or more vehicle operator selectable inputs, damping analysis and vehicle attitude analysis; and dynamically controlling, in response to (i) a selected predetermined vehicle riding mode having a corresponding damping profile, (ii) the damping analysis, and (iii) the vehicle attitude analysis, the front suspension and the rear suspension to move the structure between a lowered state/position and a raised state/position.

In accordance with one or more embodiments, an example method of controlling a vehicle may comprise one or more of the following: dynamically detecting a current position of a front suspension of the suspension system, a current position of the rear suspension of the suspension system, a current preload of the front suspension, and a current preload of the rear suspension; dynamically executing, in response to the detection and the one or more vehicle operator selectable inputs, damping analysis and vehicle attitude analysis of the sensor data; and dynamically adjusting, in response to (i) a selected predetermined vehicle riding mode having a corresponding damping profile, (ii) the damping analysis, and (iii) the vehicle attitude analysis, the vehicle attitude through the dynamic control of the front suspension and the rear suspension.

In accordance with one or more embodiments, an example computer-implemented method of controlling a vehicle is provided, the method comprising: dynamically detecting a current vehicle speed, a current position of a front suspension of the suspension system, a current position of the rear suspension of the suspension system, a current preload of the front suspension, and a current preload of the rear suspension; dynamically executing, in response to the detection, a damping analysis and a vehicle attitude analysis; and dynamically controlling, in response to the detected current vehicle speed, the damping analysis, and the vehicle attitude analysis, the front suspension and the rear suspension to move the structure between a lowered state/position and a raised state/position.

In accordance with one or more embodiments, one or more example vehicle ARH systems, vehicles, computer products, and computer-implemented methods are provided to offer both semi-active damping and ARH functionality. In particular, each example vehicle ARH system, computer product, and computer-implemented method is operable to dynamically control the vehicle, in response to dynamic detection of one or more operational parameters, between a raised vehicle state or position and a lowered vehicle state or position. Such dynamic control facilitates greater reach-to-ground when in the lowered vehicle state and automatically controls vehicle ride height when in the raised vehicle state for dynamic loading conditions.

Each example vehicle ARH system, vehicle, computer product, and computer-implemented method combines all the benefits of a passive "lowered" suspension (e.g., lowered seat height/reach-to-ground, "slammed" custom look) with all the benefits of a passive "longer-travel" suspension (e.g., enhanced ride quality and dynamic capability) with none of the limitations or compromises that are associated with each individual passive suspension configuration. Each example ARH system is also operable to facilitate greater dynamic capabilities when the vehicle is the lowered vehicle state.

Each example vehicle ARH system, vehicle, computer product, and computer-implemented method is operable to control the suspension system in a way that dynamically self-levels the vehicle during operation of the vehicle, the self-leveling taking into consideration the amount of sag caused by the mounting of the operator on the vehicle. In that way, improper manual preload adjustment or failure to manually adjust preload (under a significant range of loading conditions) are eliminated.

Each example vehicle ARH system, vehicle, computer product, and computer-implemented method is operable to dynamically move the vehicle to the lowered vehicle state or position and thereby to lower the seat height (e.g., when the vehicle is in an "at-rest" state) in a manner which facilitates accommodation of a larger range of riders (i.e., shorter riders) while also providing enhanced ride comfort/quality. Dynamic movement of the vehicle to the lowered vehicle state also enhances the overall stability of the vehicle at rest by enhancing the rider's reach-to-ground (tip-toe condition). Dynamic movement of the vehicle to the lowered vehicle state at-rest height further results in an enhanced, dropped/lowered "stance" of the vehicle, from a styling perspective, while in a parked state. Accordingly, the system ARH obtains a lower seat height when the vehicle is in an at-rest position or state.

Each example vehicle ARH system, vehicle, computer product, and computer-implemented method is operable to dynamically move the vehicle to the raised height state by raising the chassis, thereby resulting in enhanced dynamic capabilities through increased suspension travel (i.e., ride comfort/quality), increased ground clearance, and increased lean angle.

Each example vehicle ARH system, vehicle, computer product, and computer-implemented method facilitates efficient design for ease of packaging by use of road energy as a power source instead of using conventional power sources.

As opposed to integrating an accelerometer for relative velocity and position, each example vehicle ARH system, vehicle, computer product, and computer-implemented method provides more efficient chassis control and greater accuracy by implementation of, for example but not limited to, inductive position sensors operable to dynamically detect front suspension position, rear suspension position, front preload position, and rear preload position. Implementation of position sensors to detect front preload position and rear preload position facilitates direct control of the suspension in a manner that obtains an optimal vehicle attitude.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

DETAILED DESCRIPTION

Figure 1:
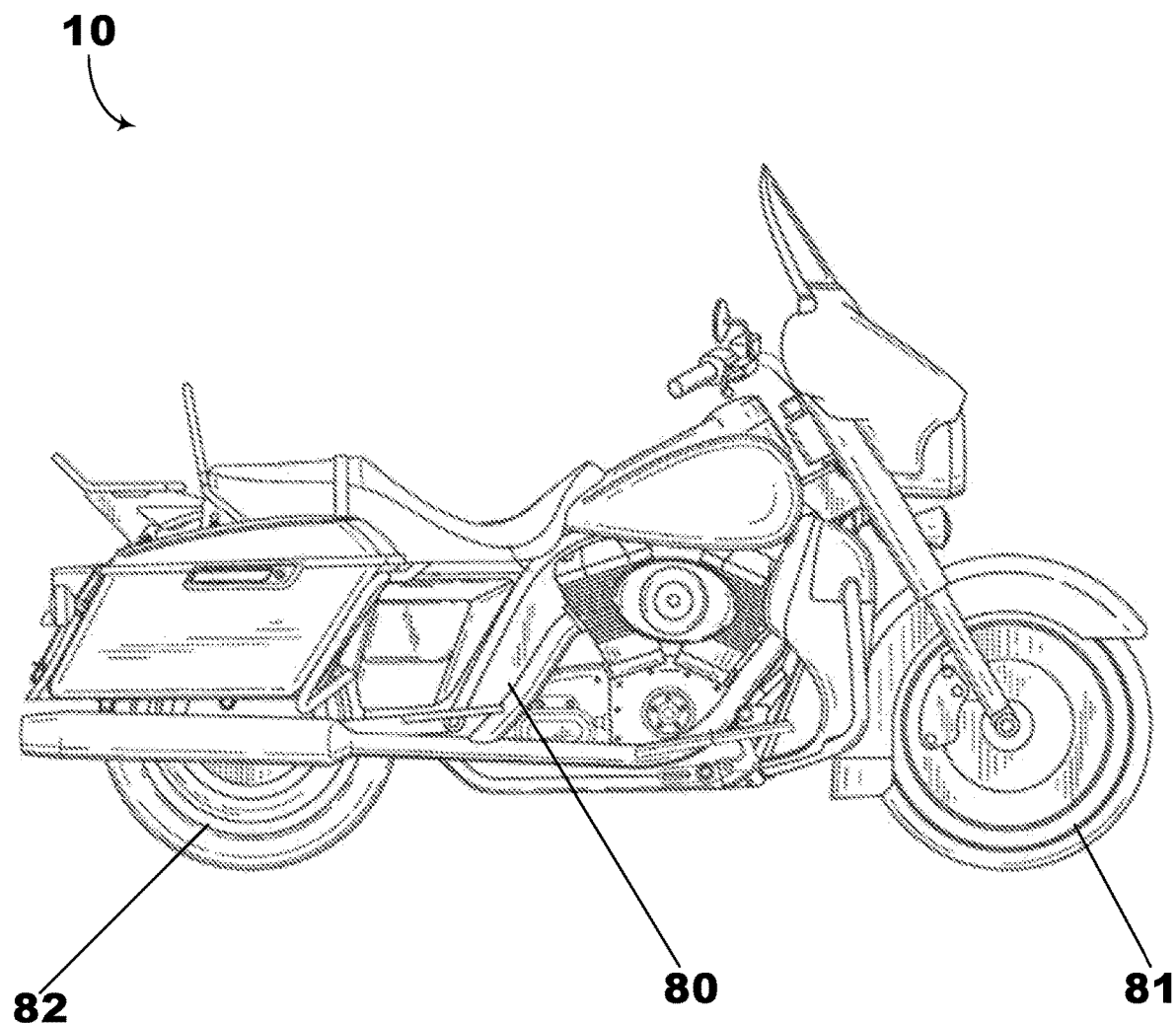
FIG. 1 illustrates an example vehicle having an ARH system, in accordance with one or more embodiments shown and described herein.
Figure 2:
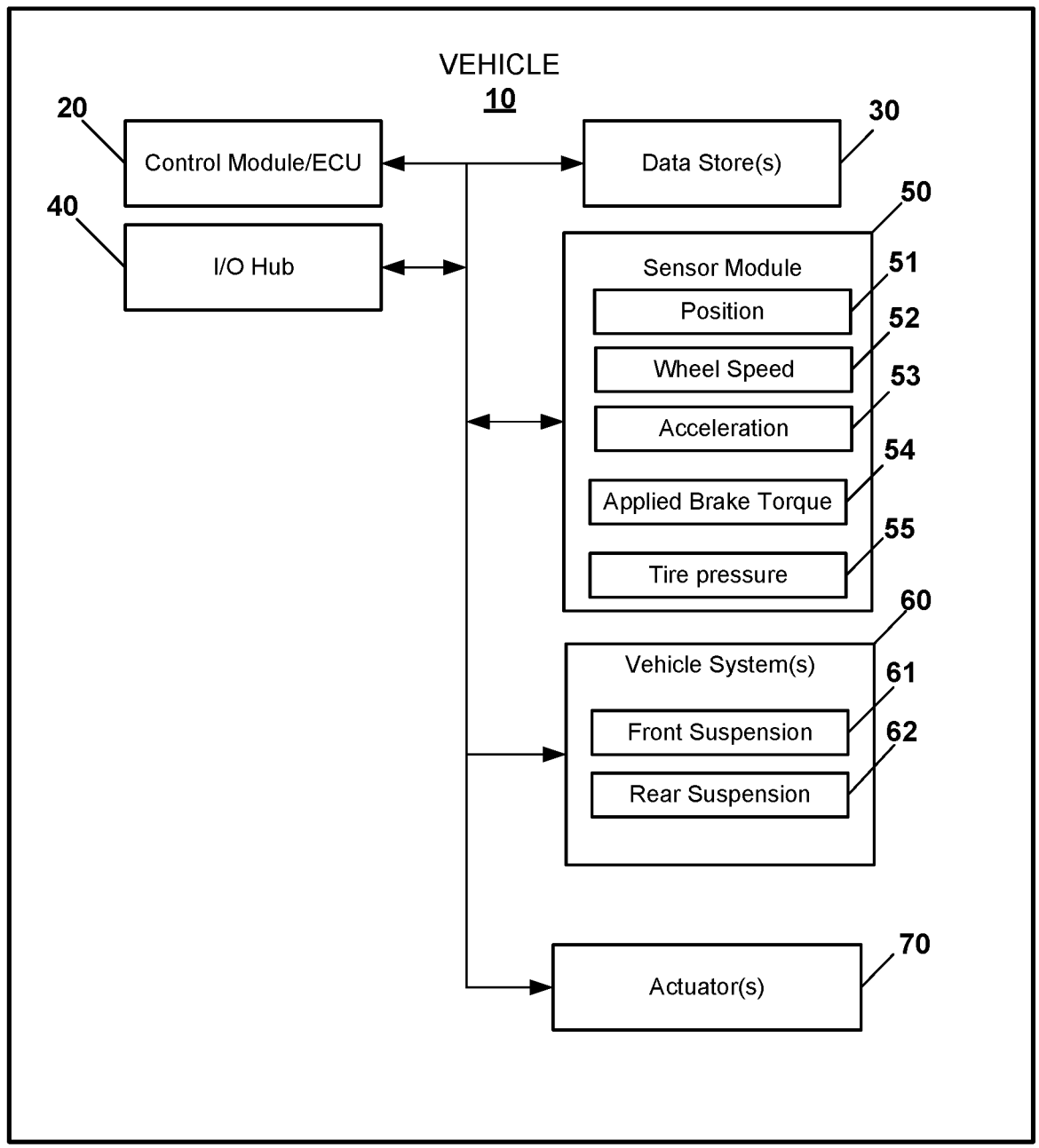
FIG. 2 illustrates a block diagram of the example vehicle, in accordance with one or more embodiments shown and described herein.

Turning to the figures, in which FIGS. 1 and 2 respectively illustrate an example vehicle 10, and an example ARH system 100 for the vehicle 10. In the illustrated examples, the vehicle 10 comprises a motorcycle. Embodiments, however, are not limited thereto, and thus, this disclosure contemplates the vehicle comprising any suitable vehicle that falls within the spirit and scope of the principles of this disclosure.

Figure 7:
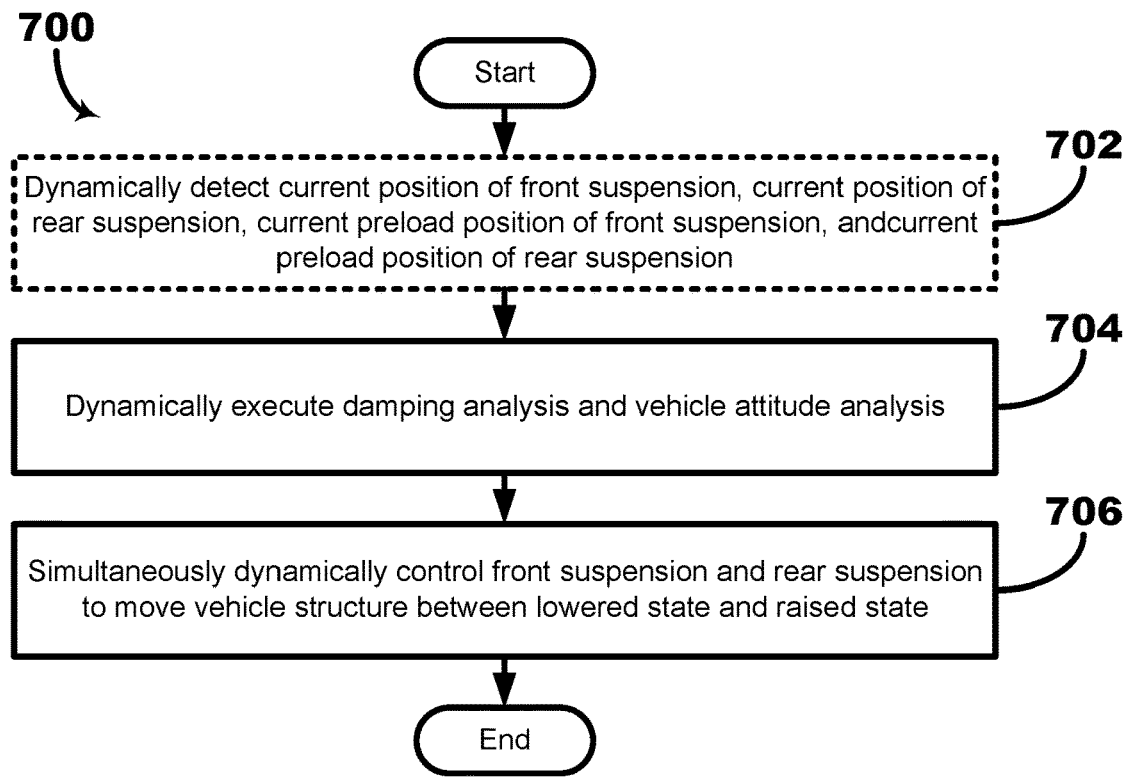

As illustrated in FIGS. 1 and 7, the vehicle 10 comprises a structure 80, e.g., chassis, frame, subframe, body, etc.) provided with a front wheel 81 and a rear wheel 82. The structure 80 is supported by a suspension system 60 operable to dynamically dampen movement of the structure 80 during operation of the vehicle 10 as the vehicle 10 traverses or otherwise travels over a road surface to provide enhanced comfort to the user, operator, or rider of the vehicle 10. The suspension system 60 comprises a front suspension system 61 that includes a front semi-active damper operatively connected to the front wheel 81 and a rear suspension system 62 that includes a rear semi-active damper operatively connected to the rear wheel 82.

In accordance with one or more embodiments, the ARH system 100 may not include one or more of the elements illustrated in FIG. 2. The ARH system 100 may have additional elements to those illustrated in FIG. 2. Moreover, while the various operational parameters or elements are illustrated as being located within or on the vehicle 10, embodiments are not limited thereto, and thus, one or more of the operational elements may be located external to the vehicle 10, and even physically separated by large spatial distances.

In accordance with one or more embodiments, the ARH system 100 comprises a control module 20 that serves as a host, main, or primary control system of the vehicle 10. For example, the control module 20 may comprise an electronic or engine control unit (ECU). The control module 20 may comprise one or more processors 21. As set forth, described, and/or illustrated herein, "processor" means any component or group of components that are operable to execute any of the processes described herein or any form of instructions to carry out such processes or cause such processes to be performed. The processors 21 may be implemented with one or more general-purpose and/or one or more special-purpose processors. Examples of suitable processors include graphics processors, microprocessors, microcontrollers, DSP processors, and other circuitry that may execute software (e.g., stored on a non-transitory computer-readable medium). Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processors 21 may comprise at least one hardware circuit (e.g., an integrated circuit) operable to carry out instructions contained in program code. In embodiments having a plurality of processors 21, such processors 21 may work independently from each other, or one or more processors may work in combination with each other.

In accordance with one or more embodiments, the ARH system 100 comprises an I/O hub 40 operatively connected to other systems and subsystems of the vehicle 10. The I/O hub 40 may comprise an input interface and an output interface. The input interface and the output interface may be integrated as a single, unitary interface, or alternatively, be separate as independent interfaces that are operatively connected.

In one or more embodiments, the input interface may be used by a user, such as, for example, a user, operator, or rider of the vehicle 10, to input as a data input signal 40B, a selected predetermined vehicle riding mode among a plurality of predetermined vehicle riding modes to accommodate a riding style of the rider or operator in a manner that obtains a specific ride height for the user, operator, or rider. Each predetermined vehicle riding mode has a corresponding damping profile during operation of the vehicle 10. The input interface is defined herein as any device, component, system, subsystem, element, or arrangement or groups thereof that enable information/data to be entered in a machine. The input interface may receive an input from a vehicle operator (e.g., a driver or rider of the vehicle 10) or a remote operator of the vehicle 10. In one or more example embodiments, the input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be presented to the vehicle operator and/or a remote operator of the vehicle 10. The output interface may be operable to present information/data to the vehicle occupant and/or the remote operator. The output interface may comprise one or more of a visual display or an audio display such as a microphone, earphone, and/or speaker. One or more components of the vehicle 10 may serve as both a component of the input interface and a component of the output interface.

In accordance with one or more embodiments, the ARH system 100 comprises one or more data stores 30 for storing one or more types of data. The ARH system 100 may include interfaces that enable one or more systems thereof to manage, retrieve, modify, add, or delete, the data stored in the data stores 30. The data stores 30 may comprise volatile and/or non-volatile memory. Examples of suitable data stores 30 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 30 may be a component of the processors 21, or alternatively, may be operatively connected to the processors 21 for use thereby. As set forth, described, and/or illustrated herein, "operatively connected" may include direct or indirect connections, including connections without direct physical contact.

In accordance with one or more embodiments, the ARH system 100 comprises a sensor module 50 operable to, at least during operation of the vehicle 10, dynamically detect, capture, determine, assess, monitor, measure, quantify, and/or sense one or more operational parameters, elements, or features of the vehicle 10, such as, for example, vehicle speed, front suspension stroke or position, rear suspension stroke position, front suspension preload, rear suspension preload, etc. As set forth, described, and/or illustrated herein, "sensor" means any device, component, system, and/or subsystem that can perform one or more of detecting, determining, assessing, monitoring, measuring, quantifying, and sensing something. The one or more sensors may be operable to detect, determine, assess, monitor, measure, quantify and/or sense in real-time. As set forth, described, and/or illustrated herein, "real-time" means a level of processing responsiveness that a user, system, or subsystem senses as sufficiently immediate for a particular process or determination to be made, or that enables the processor to keep up with some external process.

In accordance with one or more embodiments, operation of the control module 20 may be implemented as computer readable program code that, when executed by a processor, implement one or more of the various processes set forth, described, and/or illustrated herein. The control module 20 may be a component of the processors 21, or alternatively, may be executed on and/or distributed among other processing systems to which the processors 21 are operatively connected. The control module 20 may include a set of logic instructions executable by the processors 21. Alternatively, or additionally, the data stores 30 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 3:
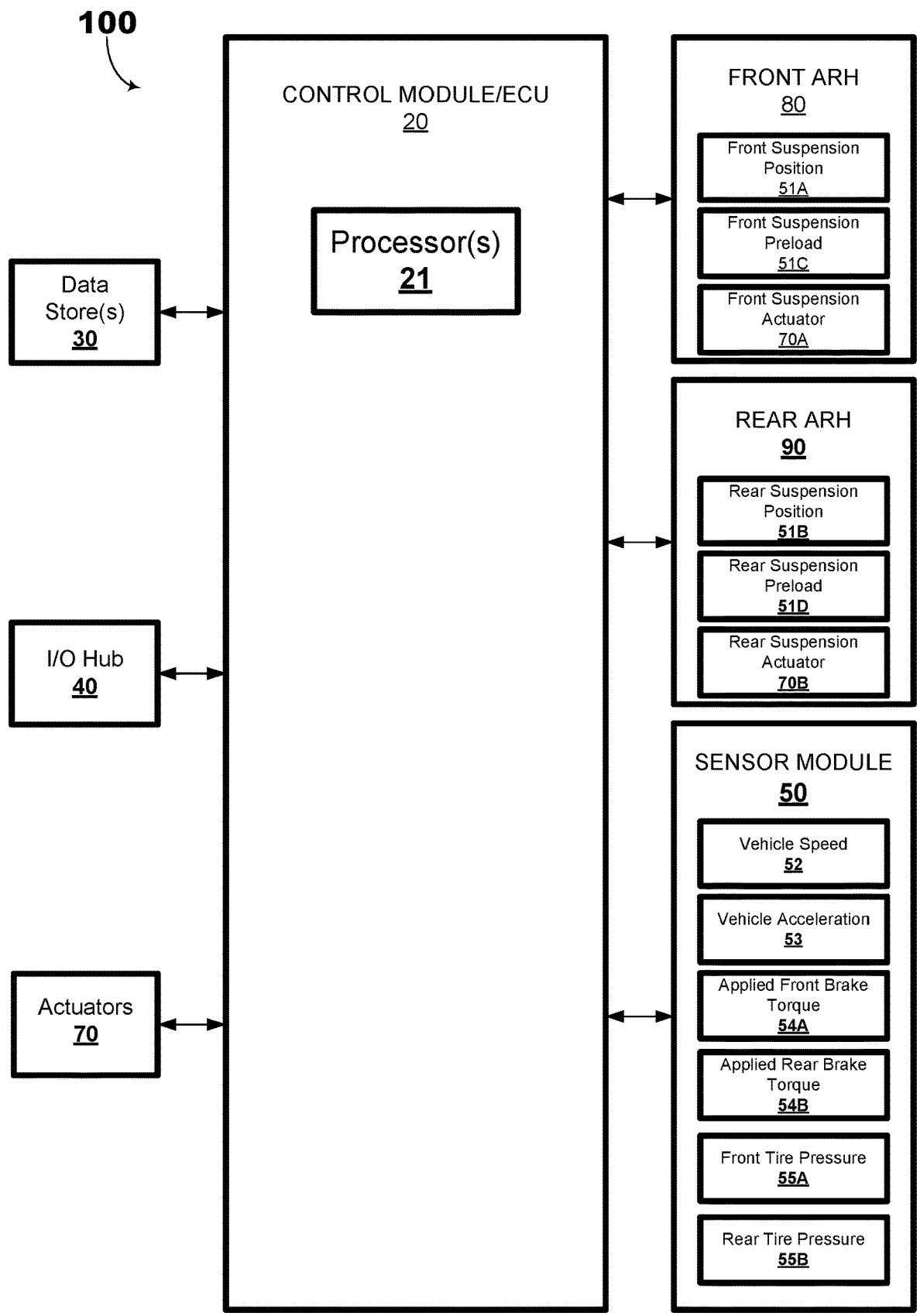
FIG. 3 illustrates a block diagram of the example ARH system, in accordance with one or more embodiments shown and described herein.
Figure 4:
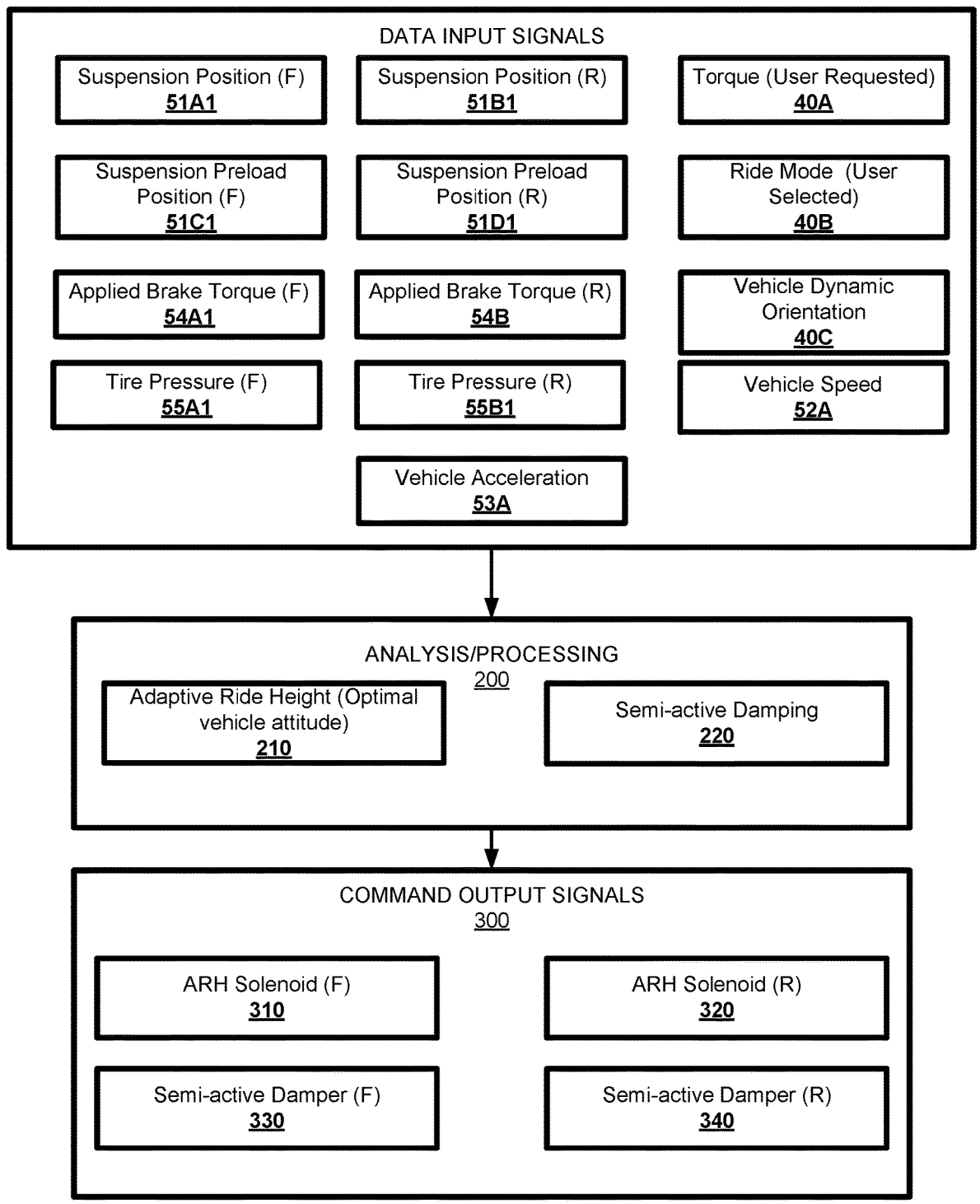
FIG. 4 illustrates a diagram of one or more control blocks of the vehicle, in accordance with one or more embodiments shown and described herein.

In the illustrated embodiment(s) of FIGS. 3 and 4, the control module 20 may be operable to facilitate, via the sensor module 50, dynamic detection as sensor data of one or more operational features of the vehicle 10. Such operational may include, but are not limited to, a current position of the front suspension 21 of the suspension system 60, a current position of the rear suspension 22 of the suspension system 20, a current preload of the front suspension 21, a current preload of the rear suspension 22, a current tire pressure of the front wheel 81, a current tire pressure of the rear wheel 82, current vehicle speed, current vehicle acceleration, current applied torque on the front brake, and current applied torque on the rear brake. The captured sensor data may be located in a vehicle database of the data stores 30 or an external source (e.g., cloud-based data store(s)).

In accordance with one or more embodiments, the control module/ECU 20 is operable to control the Front ARH system 80 and the Rear ARH system 90. The Front ARH system 80 comprises the front suspension position sensor 51A, the front suspension preload sensor 51C, and the front suspension actuator 70A. The Rear ARH system 90 comprises the rear suspension position sensor 51B, the rear suspension preload sensor 51D, and the rear suspension actuator 70B.

During operation of the vehicle 10, the control module/ECU 20 is operable to dynamically receive one or more data input signals 51A1, 51C1 from the front suspension position sensor 51A and the front suspension preload sensor 51C, and then, in response thereto, dynamically execute a damping analysis and a vehicle attitude analysis. In response to the damping analysis and a vehicle attitude analysis, the control module/ECU 20 may then transmit one or more control signals to the front suspension actuator 70A. The control module/ECU 20 is also operable to dynamically receive one or more data input signals 51B1, 51D1 from the rear suspension position sensor 51B and the rear suspension preload sensor 51D, and then, in response thereto, dynamically execute a damping analysis and a vehicle attitude analysis. In response to the damping analysis and a vehicle attitude analysis, the control module/ECU 20 may then transmit one or more control signals to the rear suspension actuator 70B.

In accordance with one or more embodiments, one or more of the modules 20, 50 set forth, described, and/or illustrated herein may include artificial or computational intelligence elements, e.g., neural network, fuzzy logic, or other machine learning algorithms.

In accordance with one or more embodiment, one or more of the control module/ECU 20 and the one or more of the processors 21 are operatively connected to communicate with the suspension system 60 and/or individual components thereof. For example, as illustrated in FIG. 3, the one or more of the processors 21 are in communication to send one or more command output signals 310, 320, 330, 340, and/or receive data input signals 40A-40C, $51A_1$-$51D_1$, 54A, and 55A from the I/O hub 40, and the sensor module 50 to dynamically control the suspension system 60 in a manner that achieves both semi-active damping and ARH functionality.

The vehicle 10 may comprise one or more actuators 70 operatively connected (e.g., via wire and/or wireless communication) to the control module 20. The actuators 70, which may be any element or combination of elements operable to modify, adjust and/or alter operation of the suspension system 60 or components thereof in response to receiving command signals 300 or other inputs from the one or more of the processors 21. In accordance with one or more embodiments, the actuators 70 comprise a solenoid valve. Embodiments, however, are not limited thereto, and thus, this disclosure contemplates the actuators 70 comprising any suitable configuration that falls within the spirit and scope of the principles of this disclosure. For example, such suitable actuator configuration may comprise motors, pneumatic actuators, hydraulic actuators, thermal actuators, magnetic actuators, mechanical actuators, relays, and/or piezoelectric actuators, etc.

In accordance with one or more embodiments, each individual actuator among the actuators 70 may comprise a hydraulic actuator that is operatively or fluidically connected to one or more on-road energy harvesting modules 90 which serve as a power source of the actuator during operation of the vehicle 10. The one or more on-road energy harvesting modules 90 may comprise a hydraulic pump/circuit that uses suspension motion during operation of the vehicle 10 to provide stored energy to control a corresponding hydraulic actuator.

In accordance with one or more embodiments, the sensor module 50 comprises one or more inductive position sensors 51, vehicle speed sensors 52, vehicle accelerator sensors 53, applied brake torque sensors 54, and tire pressure sensors 55 operatively connected to the one or more processors 21, the data stores 30, and/or other elements, components, modules, systems, and subsystems of the vehicle 10. Embodiments, however, are not limited thereto. This disclosure contemplates the sensor module 50 comprising any suitable sensor architecture that permits practice of the one or more embodiments.

The inductive position sensors 51 comprise a front suspension position sensor 51A, a rear suspension position sensor 51B, a front suspension preload sensor 51C, and a rear suspension preload sensor 51D that are spatially arranged on, in close spatial proximity to, or adjacent to a corresponding front suspension 61 or rear suspension 62 of the suspension system 60 to dynamically detect, determine, assess, monitor, measure, quantify, as sensor data, one or more operational features of the front suspension 61 and the rear suspension 62. Such operational features include, but are not limited to, the current position or state of the front suspension 61, current position or state of the rear suspension 62, current preload position or state of the front suspension 61, and current preload position or state of the rear suspension 62. The one or more inductive position sensors 51 may work independently from each other, or alternatively, may work in combination with each other. The one or more inductive position sensors 51 may be used in any combination, and may be used redundantly to validate and improve the accuracy of the detection.

The one or more vehicle speed sensors 52 are spatially arranged on, in close spatial proximity to, or adjacent to one or more of the vehicle front wheel and the vehicle rear wheel to dynamically detect, determine, assess, monitor, measure, quantify, as sensor data, the current speed of the vehicle 10 based on the wheel speed of one or more of the front wheel and the rear wheel. The one or more vehicle speed sensors 52 may work independently from each other, or alternatively, may work in combination with each other. The one or more vehicle speed sensors 52 may be used in any combination, and may be used redundantly to validate and improve the accuracy of the detection.

The one or more vehicle acceleration sensors 53 are spatially arranged on, in close spatial proximity to, or adjacent to the vehicle structure 80 to dynamically detect, determine, assess, monitor, measure, quantify, as sensor data, acceleration of the vehicle body 80 as it traverses over a road surface. The one or more vehicle acceleration sensors 53 may work independently from each other, or alternatively, may work in combination with each other. The one or more vehicle acceleration sensors 53 may be used in any combination and may be used redundantly to validate and improve the accuracy of the detection.

The one or more applied brake torque sensors 54 are spatially arranged on, in close spatial proximity to, or adjacent to one or more of the vehicle front brake and the vehicle rear brake to dynamically detect, determine, assess, monitor, measure, quantify, as sensor data, the applied brake torque on one or more of the front wheel and the rear wheel of the vehicle 10. The one or more applied brake torque sensors 54 may work independently from each other, or alternatively, may work in combination with each other. The one or more applied brake torque sensors 54 may be used in any combination and may be used redundantly to validate and improve the accuracy of the detection.

The tire pressure sensors 55 comprise a front tire pressure sensor 55A and a rear tire pressure sensor 55B that are spatially arranged on, in close spatial proximity to, or adjacent to a corresponding front wheel 81 or rear wheel 82 to dynamically detect, determine, assess, monitor, measure, quantify, as sensor data, the tire pressure of the front wheel 81 and the rear wheel 82. The one or more tire pressure sensors 55 may work independently from each other, or alternatively, may work in combination with each other. The one or more tire pressure sensors 55 may be used in any combination and may be used redundantly to validate and improve the accuracy of the detection.

In accordance with one or more embodiments, the control module 20 is to receive one or more data input signals 40A-40C, 51A$_1$-51D$_1$, 52A, 53A, 54A, 55A$_1$, and 55B$_1$ from the sensor module 50, and in response thereto, the one or more processors 21 are to execute an analysis 200, including, but not limited to, an ADR or optimal vehicle attitude analysis 210 and a semi-active damping analysis 220.

In accordance with one or more embodiments, in response to one or more of the damping analysis and the vehicle attitude analysis, the one or more processors 21 are to execute the set of instructions to control the suspension system 60 (e.g., both the front suspension 61 and the rear suspension 62) by sending one or more command output signals 310, 320, 330, 340 to the actuators 70 in order to move the structure 80 between a lowered state/position (e.g., during deceleration and/or stopping of the vehicle) and a raised state/position (e.g., in order to achieve a desired or optimal ride height). Alternatively or additionally, in an instance where the user, operator, or rider selects a specific or predetermined vehicle riding mode, the one or more processors 21, in response to the selected predetermined vehicle riding mode, the damping analysis, and the vehicle attitude analysis, are to execute the set of instructions to control the suspension system 60 by sending one or more command output signals 310, 320, 330, 340 to the actuators 70 in order to move the structure 80 between the lowered state/position and the raised state/position. Particularly, the one or more processors 21 are operable to simultaneously control the front suspension 61 and the rear suspension 62 in a manner that raises/lowers the front of the vehicle 10 and the rear of the vehicle 10 in a symmetrical manner.

In accordance with one or more embodiments, in an instance where the vehicle 10 is in which the ARH system 100 cannot fully support a maximum loading condition, which results in a different over sag operating condition, the one or more processors 21 may be operable to execute the set of instructions to dynamically place the vehicle 10 in a riding mode that accommodates for the over sag operating condition.

In accordance with one or more embodiments, the one or more processors 21, in response to the damping analysis and the vehicle attitude analysis, are to execute the set of instructions to control the suspension system 60 by sending one or more command output signals 310, 320, 330, 340 to the actuators 70 to dynamically adjust the vehicle attitude through the dynamic control of the front suspension and the rear suspension (e.g., at rest states of the vehicle 10 and during operation of the vehicle 10). Alternatively or additionally, in an instance where the user, operator, or rider selects a specific or predetermined vehicle riding mode, the one or more processors 21, in response to the selected predetermined vehicle riding mode, the damping analysis, and the vehicle attitude analysis, are to execute the set of instructions to control the suspension system 60 by sending one or more command output signals 310, 320, 330, 340 to the actuators 70 to dynamically adjust the vehicle attitude.

In accordance with one or more embodiments, the one or more processors 21 may be operable to execute the set of instructions to dynamically calculate or otherwise estimate vehicle loading based on one or more input signals relating to certain detected operational parameters of the vehicle 10. In response to the calculation or estimation of vehicle loading, the control module/ECU 20 may control the front semi-active damper of the front suspension 61 and the rear semi-active damper of the front suspension 62.

In the illustrated examples of FIGS. 5 to 34, a flowchart of computer-implemented methods 500 through 3400 for controlling a vehicle. In one or more examples, the respective flowcharts of the methods 500 through 3400 may be implemented by the one or more processors 21. For example, the one or more processors 21 are operable to implement the methods 500 through 3400 using logic instructions (e.g., software), configurable logic, fixed-functionality hardware logic, etc., or any combination thereof. In one or more examples, software executed by the control module 20 provides functionality described or illustrated herein. In particular, software (e.g., stored on a non-transitory computer-readable medium)) executing by the one or more processors 21 is operable to perform one or more processing blocks of the computer-implemented methods 500 through 3400 set forth, described, and/or illustrated herein, or provides functionality set forth, described, and/or illustrated.

Figure 5:
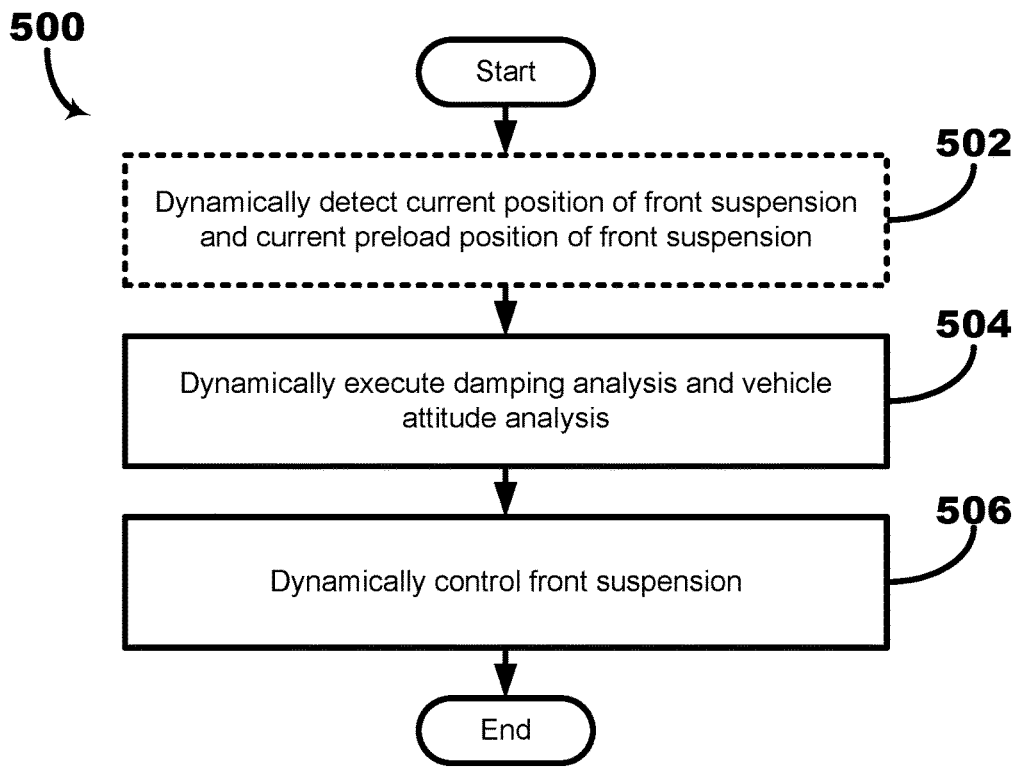
FIGS. 5 through 34 respectively illustrate a schematic diagram of example methods of controlling a vehicle, in accordance with one or more embodiments shown and described herein.

In the illustrated example computer-implemented method 500 of FIG. 5, illustrated process block 502 includes dynamically detecting a current position of a front suspension of the suspension system and a current preload of the front suspension.

The computer-implemented method 500 may then proceed to illustrated process block 504, which includes dynamically executing, in response to the detection, a damping analysis and a vehicle attitude analysis.

The computer-implemented method 500 may then proceed to illustrated process block 506, which includes dynamically controlling the front suspension in response to the damping analysis and the vehicle attitude analysis. Alternatively, or additionally, in an instance where the user, operator, or rider selects a specific or predetermined vehicle riding mode, illustrated process block 506 may include such dynamic control of the front suspension in response to the selected predetermined vehicle riding mode, the damping analysis, and the vehicle attitude analysis.

The computer-implemented method 500 may terminate or end after execution of process block 506.

Figure 6:
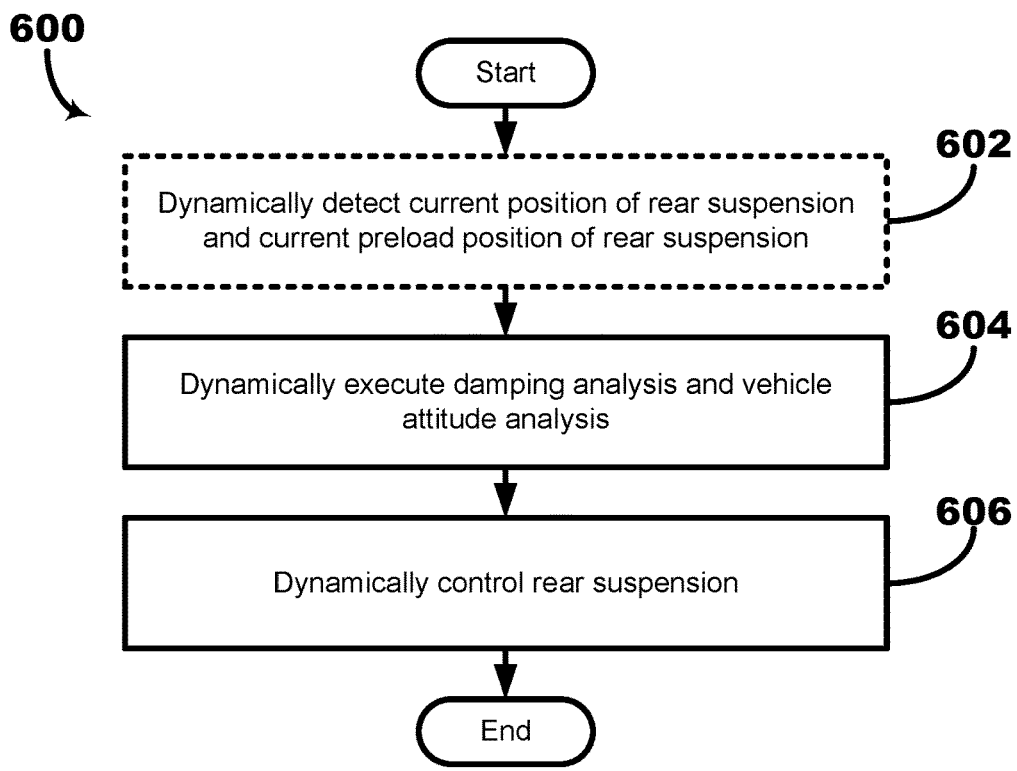

In the illustrated example computer-implemented method 600 of FIG. 6, illustrated process block 602 includes dynamically detecting a current position of a rear suspension of the suspension system and a current preload of the rear suspension.

The computer-implemented method 600 may then proceed to illustrated process block 604, which includes dynamically executing, in response to the detection, a damping analysis and a vehicle attitude analysis.

The computer-implemented method 600 may then proceed to illustrated process block 606, which includes dynamically controlling the rear suspension in response to the damping analysis and the vehicle attitude analysis. Alternatively, or additionally, in an instance where the user, operator, or rider selects a specific or predetermined vehicle riding mode, illustrated process block 606 may include such dynamic control of the rear suspension in response to the selected predetermined vehicle riding mode, the damping analysis, and the vehicle attitude analysis.

The computer-implemented method 600 may terminate or end after execution of process block 606.

In the illustrated example computer-implemented method 700 of FIG. 7, illustrated process block 702 includes dynamically detecting a current position of a front suspension of the suspension system, a current position of the rear suspension of the suspension system, a current preload of the front suspension, and a current preload of the rear suspension.

The computer-implemented method 700 may then proceed to illustrated process block 704, which includes dynamically executing, in response to the detection, a damping analysis and a vehicle attitude analysis.

The computer-implemented method 700 may then proceed to illustrated process block 706, which includes simultaneously dynamically controlling, in response to the damping analysis and the vehicle attitude analysis, the front suspension and the rear suspension to move the vehicle structure between a lowered state and a raised state. Alternatively, or additionally, in an instance where the user, operator, or rider selects a specific or predetermined vehicle riding mode, illustrated process block 706 may include such simultaneous dynamic control of the front suspension and the rear suspension in response to the selected predetermined vehicle riding mode, the damping analysis, and the vehicle attitude analysis.

The computer-implemented method 700 may terminate or end after execution of process block 706.

Figure 8:
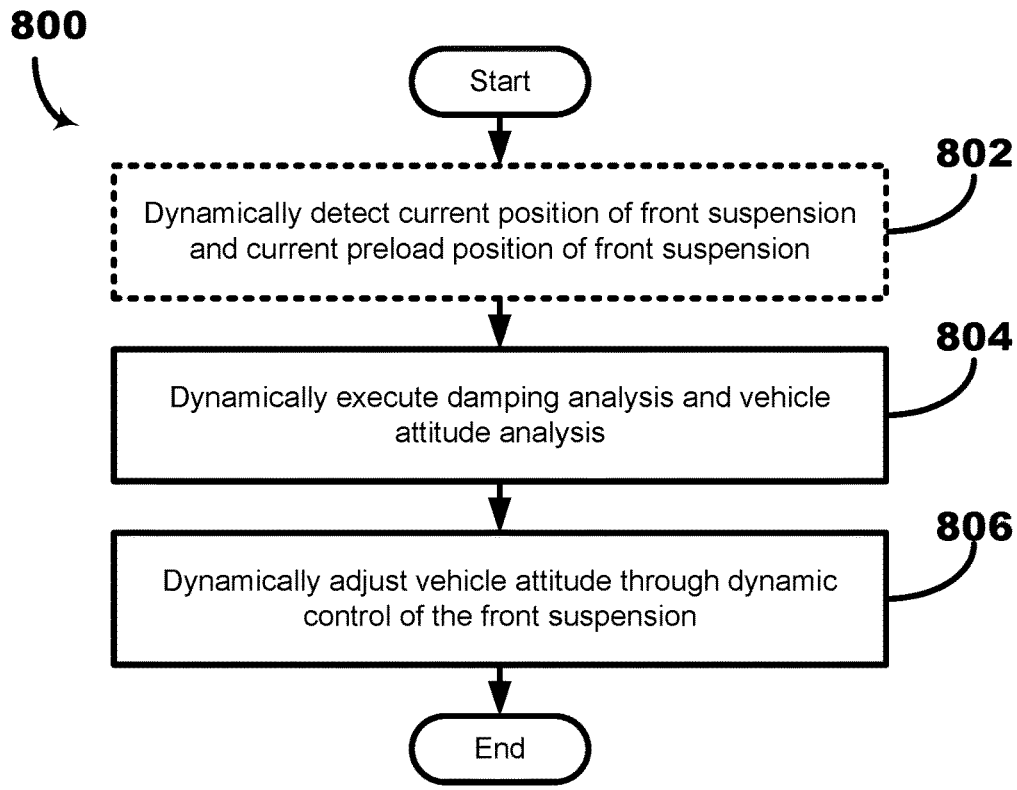

In the illustrated example computer-implemented method 800 of FIG. 8, illustrated process block 802 includes dynamically detecting a current position of a front suspension of the suspension system and a current preload of the front suspension.

The computer-implemented method 800 may then proceed to illustrated process block 804, which includes dynamically executing, in response to the detection, a damping analysis and a vehicle attitude analysis.

The computer-implemented method 800 may then proceed to illustrated process block 806, which includes dynamically adjusting, in response to the damping analysis and the vehicle attitude analysis, the vehicle attitude through the dynamic control of the front suspension. Alternatively, or additionally, in an instance where the user, operator, or rider selects a specific or predetermined vehicle riding mode, illustrated process block 806 may include such dynamic adjusting of the vehicle attitude in response to the selected predetermined vehicle riding mode, the damping analysis, and the vehicle attitude analysis.

The computer-implemented method 800 may terminate or end after execution of process block 806.

Figure 9:
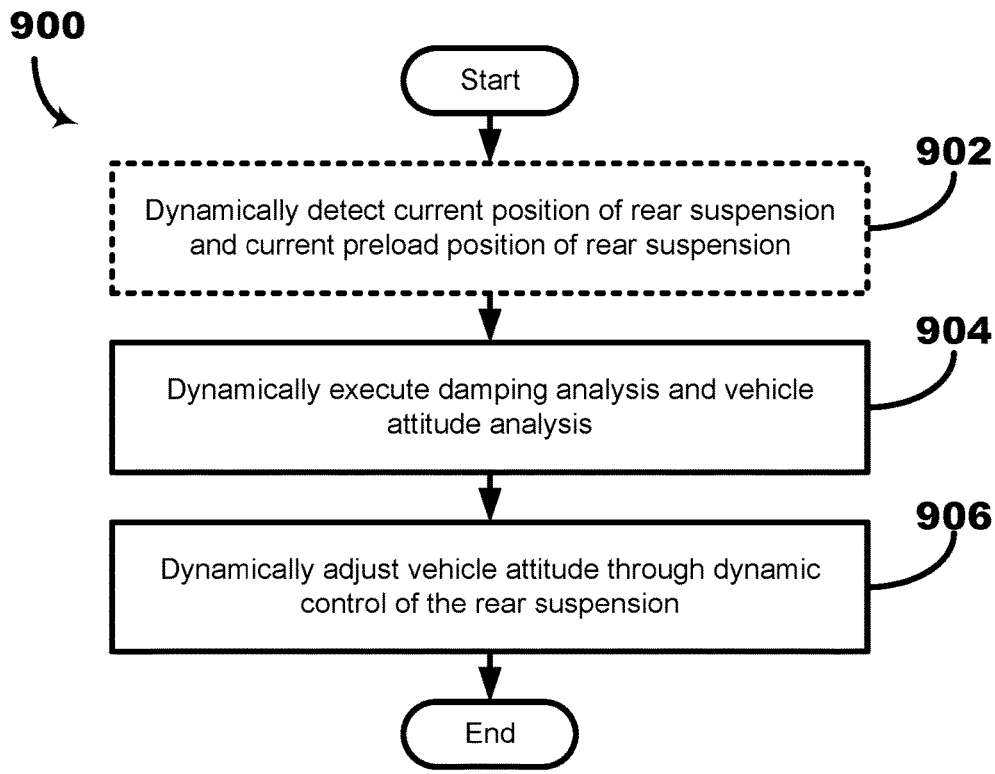

In the illustrated example computer-implemented method 900 of FIG. 9, illustrated process block 802 includes dynamically detecting a current position of a rear suspension of the suspension system and a current preload of the rear suspension.

The computer-implemented method 900 may then proceed to illustrated process block 904, which includes dynamically executing, in response to the detection, a damping analysis and a vehicle attitude analysis.

The computer-implemented method 900 may then proceed to illustrated process block 906, which includes dynamically adjusting, in response to the damping analysis and the vehicle attitude analysis, the vehicle attitude through the dynamic control of the rear suspension. Alternatively, or additionally, in an instance where the user, operator, or rider selects a specific or predetermined vehicle riding mode, illustrated process block 906 may include such dynamic adjusting of the vehicle attitude in response to the selected predetermined vehicle riding mode, the damping analysis, and the vehicle attitude analysis.

The computer-implemented method 900 may terminate or end after execution of process block 906.

Figure 10:
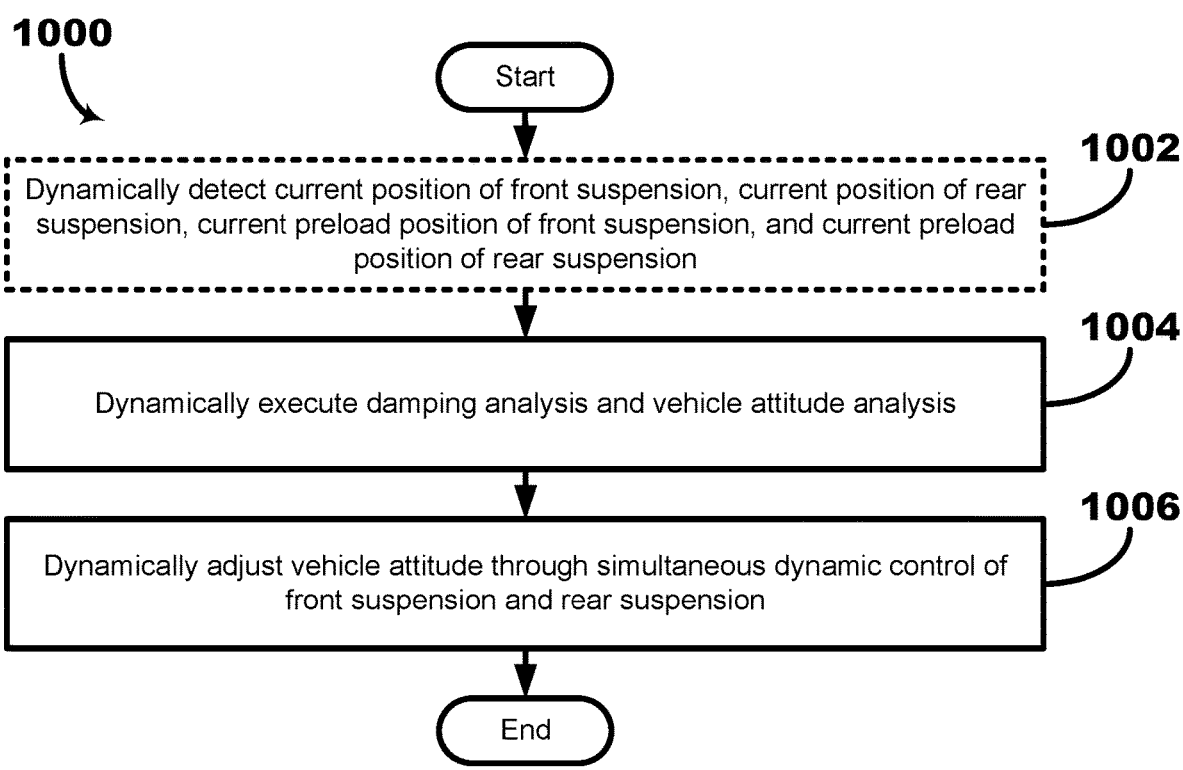

In the illustrated example computer-implemented method 1000 of FIG. 10, illustrated process block 1002 includes dynamically detecting a current position of a front suspension of the suspension system, a current position of a rear suspension of the suspension system, a current preload of the front suspension, and a current preload of the rear suspension.

The computer-implemented method 1000 may then proceed to illustrated process block 1004, which includes dynamically executing, in response to the detection, a damping analysis and a vehicle attitude analysis.

The computer-implemented method 1000 may then proceed to illustrated process block 1006, which includes dynamically adjusting, in response to the damping analysis and the vehicle attitude analysis, the vehicle attitude through the simultaneous dynamic control of the front suspension and the rear suspension. Alternatively, or additionally, in an instance where the user, operator, or rider selects a specific or predetermined vehicle riding mode, illustrated process block 1006 may include such dynamic adjusting of the vehicle attitude in response to the selected predetermined vehicle riding mode, the damping analysis, and the vehicle attitude analysis.

The computer-implemented method 1000 may terminate or end after execution of process block 1006.

Figure 11:
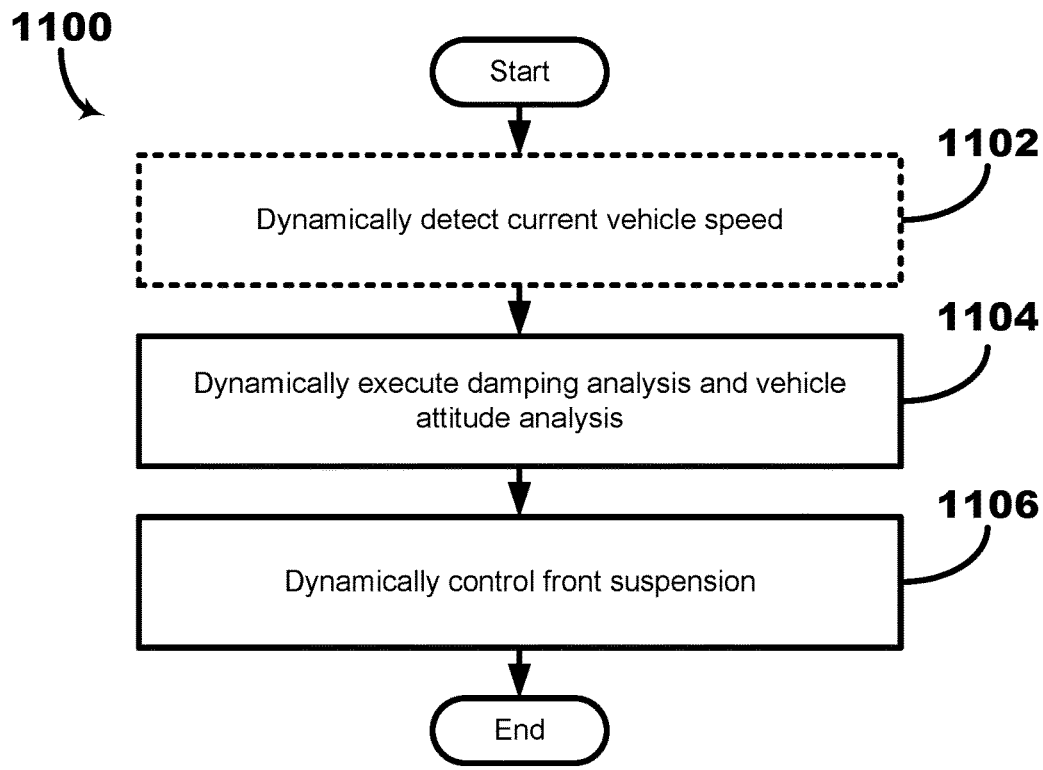

In the illustrated example computer-implemented method 1100 of FIG. 11, illustrated process block 1102 includes dynamically detecting a current vehicle speed.

The computer-implemented method 1100 may then proceed to illustrated process block 1104, which includes dynamically executing, in response to the detection, a damping analysis and a vehicle attitude analysis.

The computer-implemented method 1100 may then proceed to illustrated process block 1106, which includes dynamically controlling the front suspension in response to the damping analysis and the vehicle attitude analysis. Alternatively, or additionally, in an instance where the user, operator, or rider selects a specific or predetermined vehicle riding mode, illustrated process block 1106 may include such dynamic control of the front suspension in response to the selected predetermined vehicle riding mode, the damping analysis, and the vehicle attitude analysis.

The computer-implemented method 1100 may terminate or end after execution of process block 1106.

Figure 12:
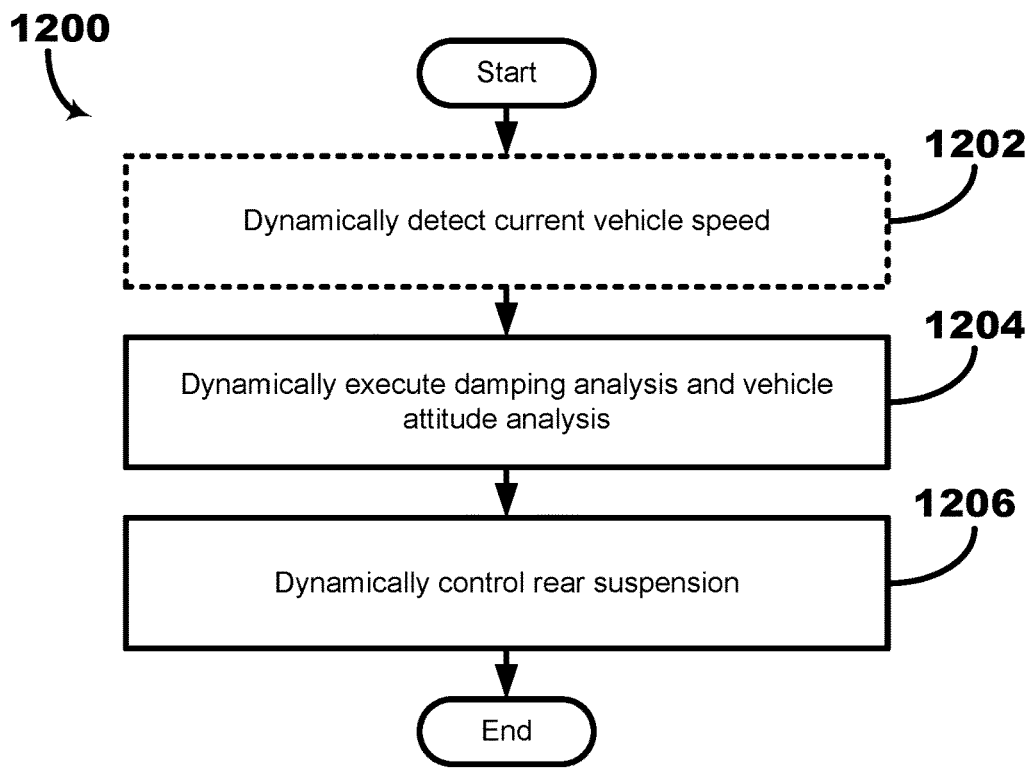

In the illustrated example computer-implemented method 1200 of FIG. 12, illustrated process block 1202 includes dynamically detecting a current vehicle speed.

The computer-implemented method 1200 may then proceed to illustrated process block 1204, which includes dynamically executing, in response to the detection, a damping analysis and a vehicle attitude analysis.

The computer-implemented method 1200 may then proceed to illustrated process block 1206, which includes dynamically controlling the rear suspension in response to the damping analysis and the vehicle attitude analysis. Alternatively, or additionally, in an instance where the user, operator, or rider selects a specific or predetermined vehicle riding mode, illustrated process block 1206 may include such dynamic control of the rear suspension in response to the selected predetermined vehicle riding mode, the damping analysis, and the vehicle attitude analysis.

The computer-implemented method 1200 may terminate or end after execution of process block 1206.

Figure 13:
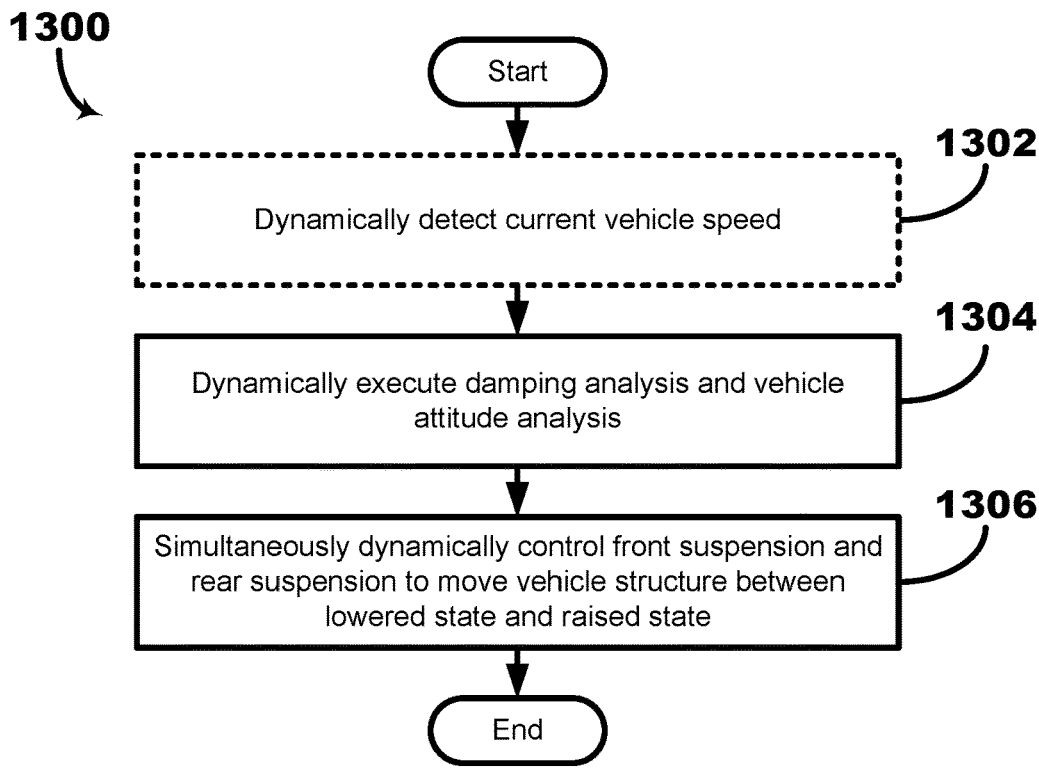

In the illustrated example computer-implemented method 1300 of FIG. 13, illustrated process block 1302 includes dynamically detecting a current position of a front suspension of the suspension system, a current position of the rear suspension of the suspension system, a current preload of the front suspension, and a current preload of the rear suspension.

The computer-implemented method 1300 may then proceed to illustrated process block 1304, which includes dynamically executing, in response to the detection, a damping analysis and a vehicle attitude analysis.

The computer-implemented method 1300 may then proceed to illustrated process block 1306, which includes simultaneously dynamically controlling, in response to the damping analysis and the vehicle attitude analysis, the front suspension and the rear suspension to move the vehicle structure between a lowered state and a raised state. Alternatively, or additionally, in an instance where the user, operator, or rider selects a specific or predetermined vehicle riding mode, illustrated process block 1306 may include such simultaneous dynamic control of the front suspension and the rear suspension in response to the selected predetermined vehicle riding mode, the damping analysis, and the vehicle attitude analysis.

The computer-implemented method 1300 may terminate or end after execution of process block 1306.

Figure 14:
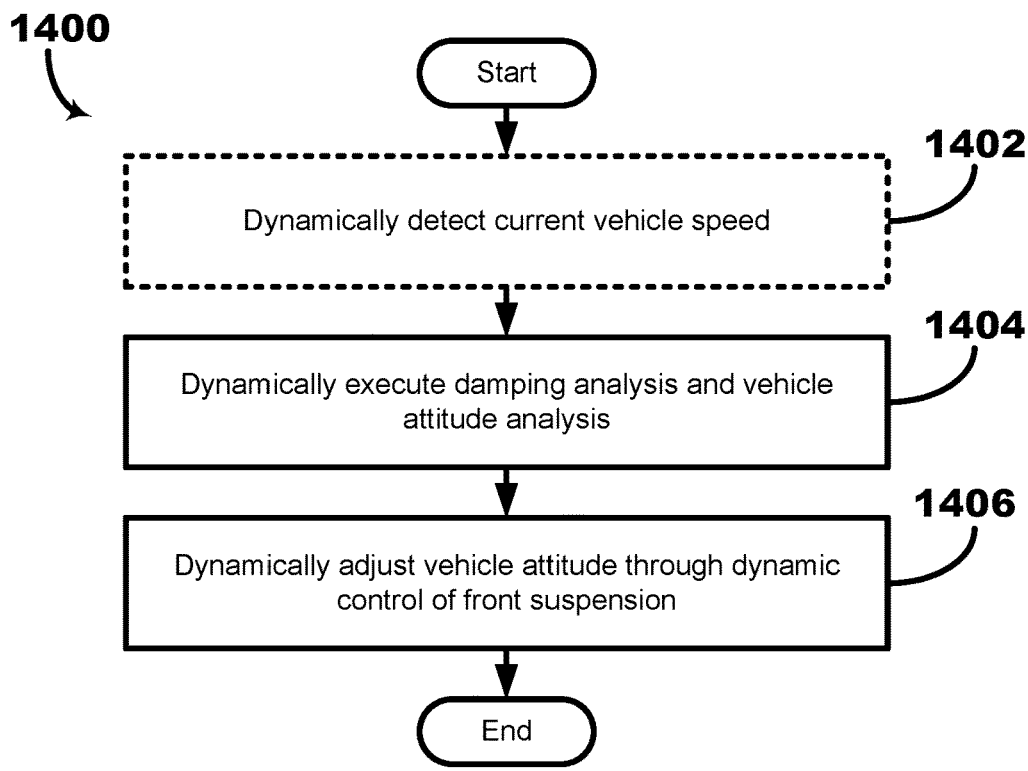

In the illustrated example computer-implemented method 1400 of FIG. 14, illustrated process block 1402 includes dynamically detecting a current vehicle speed.

The computer-implemented method 1400 may then proceed to illustrated process block 1404, which includes dynamically executing, in response to the detection, a damping analysis and a vehicle attitude analysis.

The computer-implemented method 1400 may then proceed to illustrated process block 1406, which includes dynamically adjusting, in response to the damping analysis and the vehicle attitude analysis, the vehicle attitude through the dynamic control of the front suspension. Alternatively, or additionally, in an instance where the user, operator, or rider selects a specific or predetermined vehicle riding mode, illustrated process block 1406 may include such dynamic adjusting of the vehicle attitude in response to the selected predetermined vehicle riding mode, the damping analysis, and the vehicle attitude analysis.

The computer-implemented method 1400 may terminate or end after execution of process block 1406.

Figure 15:
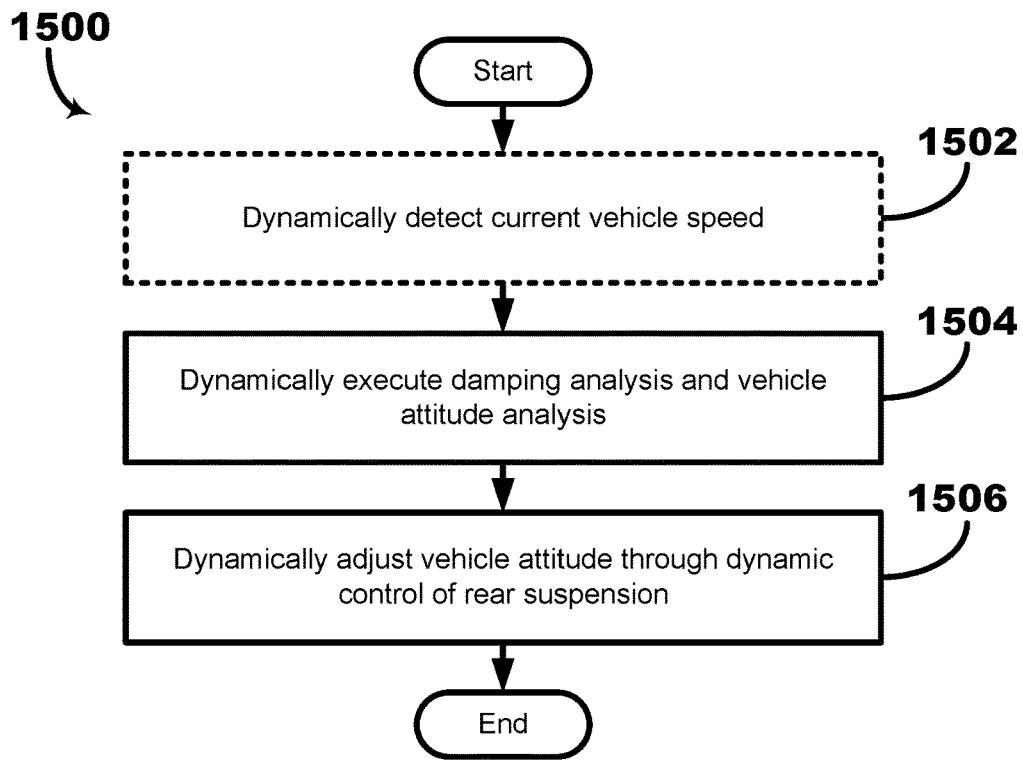

In the illustrated example computer-implemented method 1500 of FIG. 15, illustrated process block 1502 includes dynamically detecting a current vehicle speed.

The computer-implemented method 1500 may then proceed to illustrated process block 1504, which includes dynamically executing, in response to the detection, a damping analysis and a vehicle attitude analysis.

The computer-implemented method 1500 may then proceed to illustrated process block 1506, which includes dynamically adjusting, in response to the damping analysis and the vehicle attitude analysis, the vehicle attitude through the dynamic control of the rear suspension. Alternatively, or additionally, in an instance where the user, operator, or rider selects a specific or predetermined vehicle riding mode, illustrated process block 1506 may include such dynamic adjusting of the vehicle attitude in response to the selected predetermined vehicle riding mode, the damping analysis, and the vehicle attitude analysis.

The computer-implemented method 1500 may terminate or end after execution of process block 1506.

Figure 16:
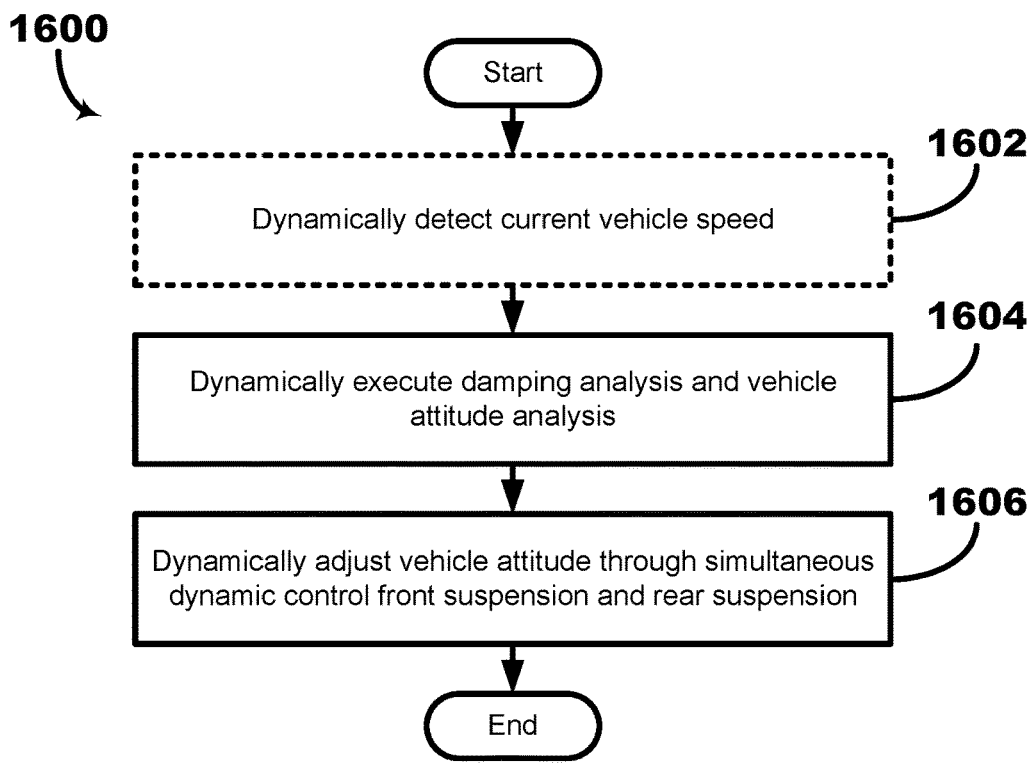

In the illustrated example computer-implemented method 1600 of FIG. 16, illustrated process block 1602 includes dynamically detecting a current vehicle speed.

The computer-implemented method 1600 may then proceed to illustrated process block 1604, which includes dynamically executing, in response to the detection, a damping analysis and a vehicle attitude analysis.

The computer-implemented method 1600 may then proceed to illustrated process block 1606, which includes dynamically adjusting, in response to the damping analysis and the vehicle attitude analysis, the vehicle attitude through the simultaneous dynamic control of the front suspension and the rear suspension. Alternatively, or additionally, in an instance where the user, operator, or rider selects a specific or predetermined vehicle riding mode, illustrated process block 1606 may include such dynamic adjusting of the vehicle attitude in response to the selected predetermined vehicle riding mode, the damping analysis, and the vehicle attitude analysis.

The computer-implemented method 1600 may terminate or end after execution of process block 1606.

Figure 17:
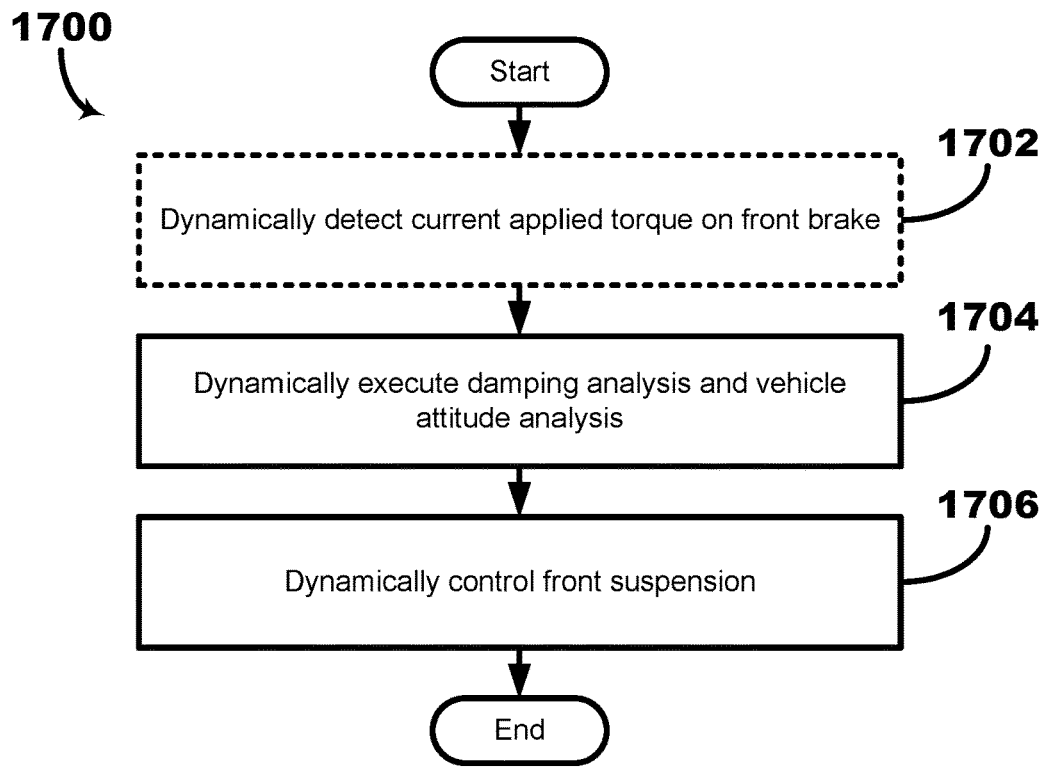

In the illustrated example computer-implemented method 1700 of FIG. 17, illustrated process block 1702 includes dynamically detecting a current applied torque on the front brake.

The computer-implemented method 1700 may then proceed to illustrated process block 1704, which includes dynamically executing, in response to the detection, a damping analysis and a vehicle attitude analysis.

The computer-implemented method 1700 may then proceed to illustrated process block 1706, which includes dynamically controlling the front suspension in response to the damping analysis and the vehicle attitude analysis. Alternatively, or additionally, in an instance where the user, operator, or rider selects a specific or predetermined vehicle riding mode, illustrated process block 1706 may include such dynamic control of the front suspension in response to the selected predetermined vehicle riding mode, the damping analysis, and the vehicle attitude analysis.

The computer-implemented method 1700 may terminate or end after execution of process block 1706.

Figure 18:
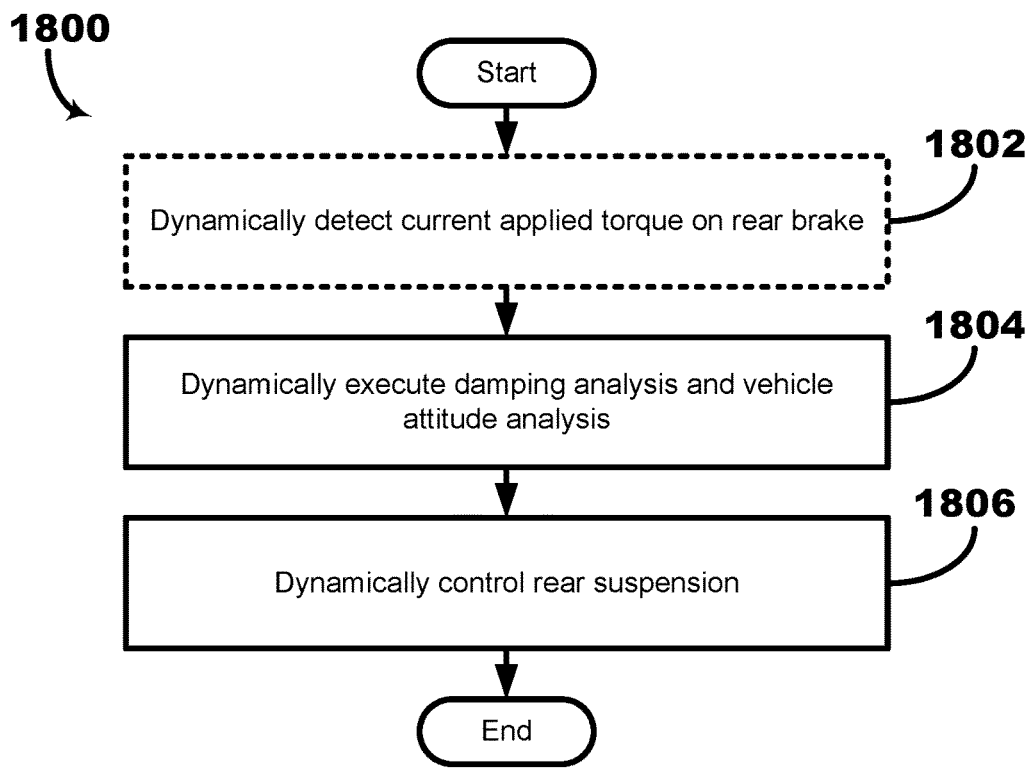

In the illustrated example computer-implemented method 1800 of FIG. 18, illustrated process block 1802 includes dynamically detecting a current applied torque on the rear brake.

The computer-implemented method 1800 may then proceed to illustrated process block 1804, which includes dynamically executing, in response to the detection, a damping analysis and a vehicle attitude analysis.

The computer-implemented method 1800 may then proceed to illustrated process block 1806, which includes dynamically controlling the rear suspension in response to the damping analysis and the vehicle attitude analysis. Alternatively, or additionally, in an instance where the user, operator, or rider selects a specific or predetermined vehicle riding mode, illustrated process block 1806 may include such dynamic control of the rear suspension in response to the selected predetermined vehicle riding mode, the damping analysis, and the vehicle attitude analysis.

The computer-implemented method 1800 may terminate or end after execution of process block 1806.

Figure 19:
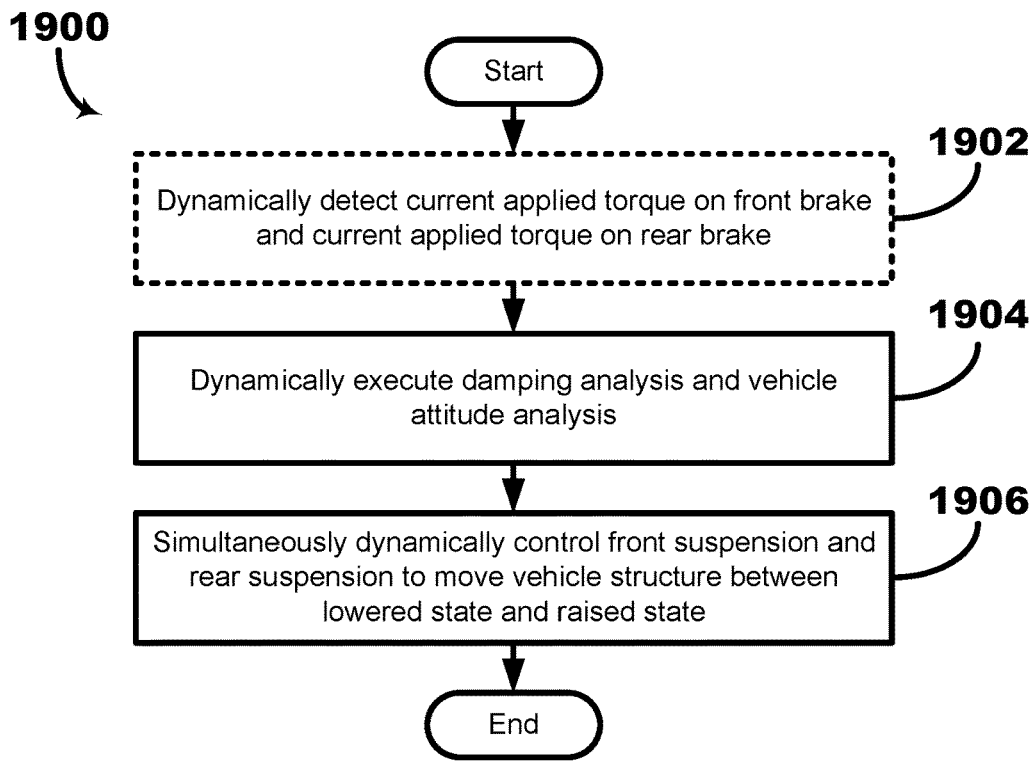

In the illustrated example computer-implemented method 1900 of FIG. 19, illustrated process block 1902 includes dynamically detecting a current applied torque on the front brake and a current applied torque on the rear brake.

The computer-implemented method 1900 may then proceed to illustrated process block 1904, which includes dynamically executing, in response to the detection, a damping analysis and a vehicle attitude analysis.

The computer-implemented method 1900 may then proceed to illustrated process block 1906, which includes simultaneously dynamically controlling, in response to the damping analysis and the vehicle attitude analysis, the front suspension and the rear suspension to move the vehicle structure between a lowered state and a raised state. Alternatively, or additionally, in an instance where the user, operator, or rider selects a specific or predetermined vehicle riding mode, illustrated process block 1906 may include such simultaneous dynamic control of the front suspension and the rear suspension in response to the selected predetermined vehicle riding mode, the damping analysis, and the vehicle attitude analysis.

The computer-implemented method 1900 may terminate or end after execution of process block 1906.

Figure 20:
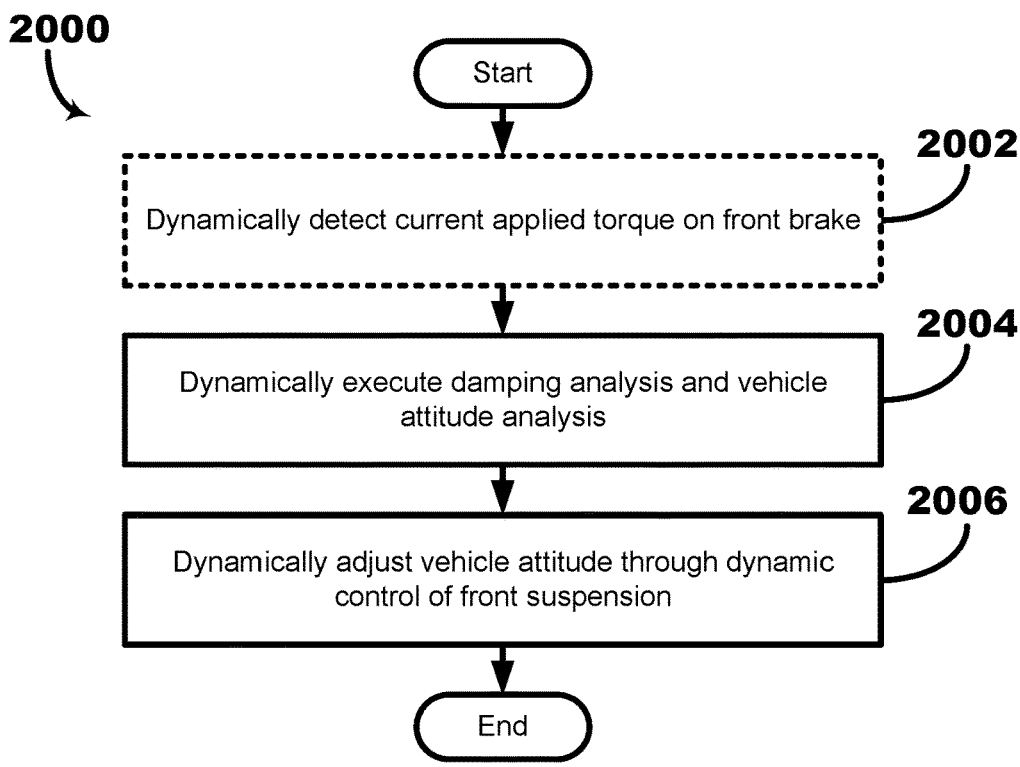

In the illustrated example computer-implemented method 2000 of FIG. 20, illustrated process block 2002 includes dynamically detecting a current applied torque on the front brake.

The computer-implemented method 2000 may then proceed to illustrated process block 2004, which includes dynamically executing, in response to the detection, a damping analysis and a vehicle attitude analysis.

The computer-implemented method 2000 may then proceed to illustrated process block 2006, which includes dynamically adjusting, in response to the damping analysis and the vehicle attitude analysis, the vehicle attitude through the dynamic control of the front suspension. Alternatively, or additionally, in an instance where the user, operator, or rider selects a specific or predetermined vehicle riding mode, illustrated process block 2006 may include such dynamic adjusting of the vehicle attitude in response to the selected predetermined vehicle riding mode, the damping analysis, and the vehicle attitude analysis. Alternatively, or additionally, in an instance where the user, operator, or rider selects a specific or predetermined vehicle riding mode, illustrated process block 2006 may include such dynamic control of the front suspension in response to the selected predetermined vehicle riding mode, the damping analysis, and the vehicle attitude analysis.

The computer-implemented method 2000 may terminate or end after execution of process block 2006.

Figure 21:
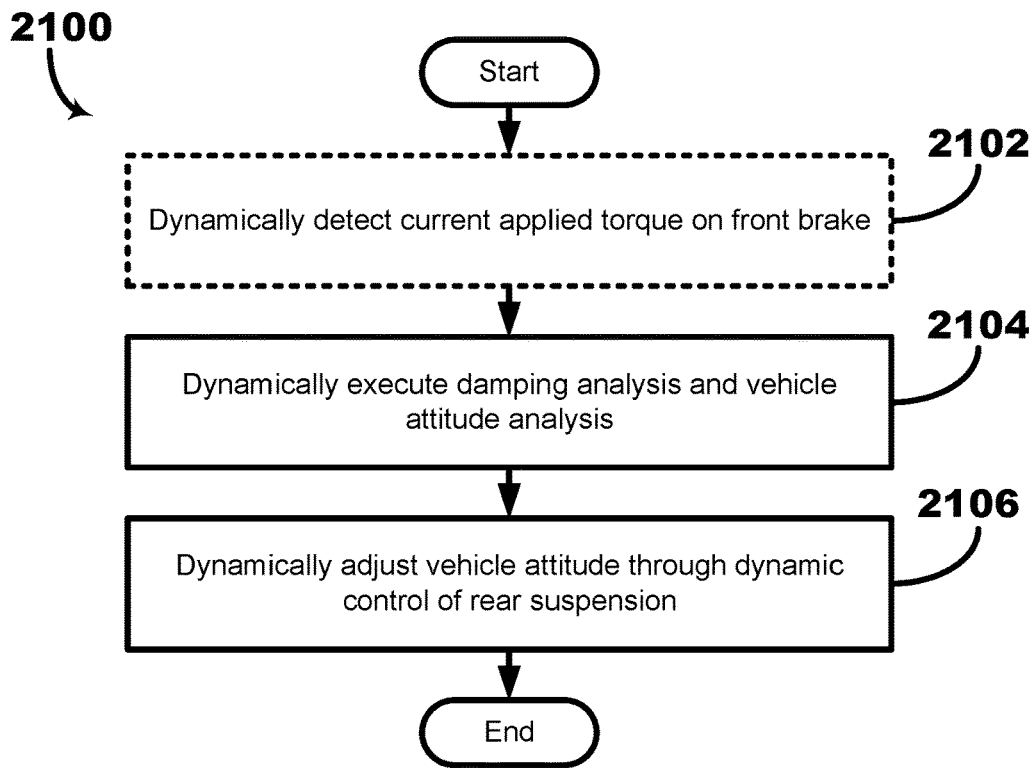

In the illustrated example computer-implemented method 2100 of FIG. 21, illustrated process block 2102 includes dynamically detecting a current applied torque on the rear brake.

The computer-implemented method 2100 may then proceed to illustrated process block 2104, which includes dynamically executing, in response to the detection, a damping analysis and a vehicle attitude analysis.

The computer-implemented method 2100 may then proceed to illustrated process block 2106, which includes dynamically adjusting, in response to the damping analysis and the vehicle attitude analysis, the vehicle attitude through the dynamic control of the rear suspension. Alternatively, or additionally, in an instance where the user, operator, or rider selects a specific or predetermined vehicle riding mode, illustrated process block 2106 may include such dynamic adjusting of the vehicle attitude in response to the selected predetermined vehicle riding mode, the damping analysis, and the vehicle attitude analysis.

The computer-implemented method 2100 may terminate or end after execution of process block 2106.

Figure 22:
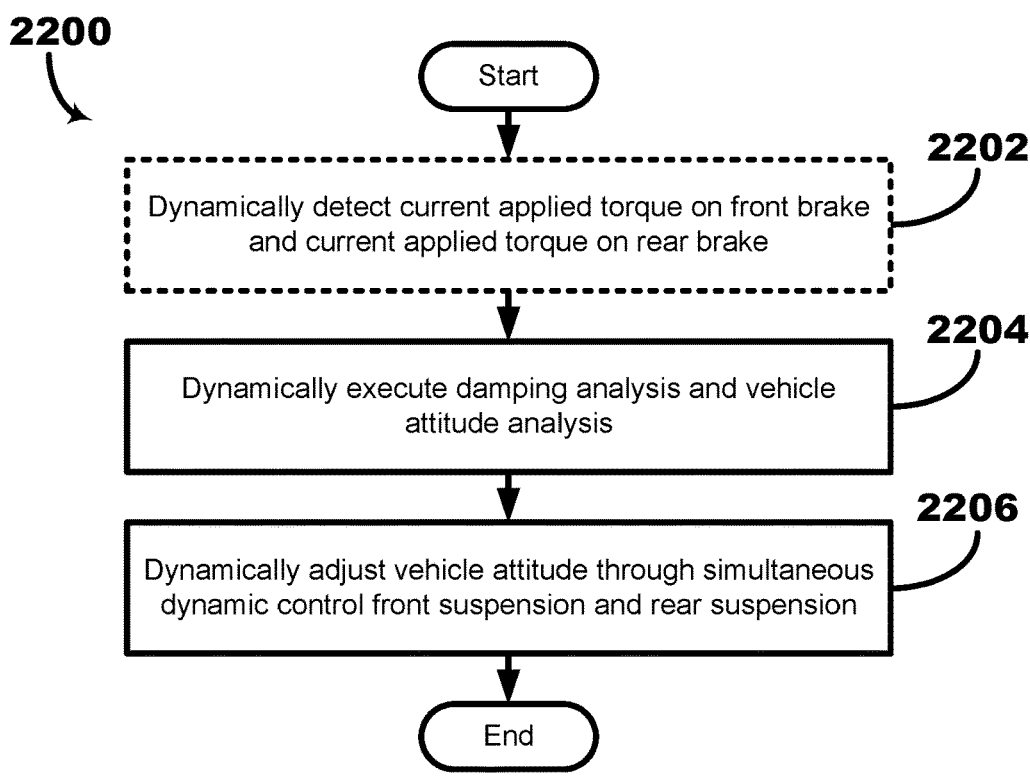

In the illustrated example computer-implemented method 2200 of FIG. 22, illustrated process block 2202 includes dynamically detecting a current applied torque on the front brake and a current applied torque on the rear brake.

The computer-implemented method 2200 may then proceed to illustrated process block 2204, which includes dynamically executing, in response to the detection, a damping analysis and a vehicle attitude analysis.

The computer-implemented method 2200 may then proceed to illustrated process block 2206, which includes simultaneously dynamically adjusting, in response to the damping analysis and the vehicle attitude analysis, the vehicle attitude through the simultaneous dynamic control of the front suspension and the rear suspension. Alternatively, or additionally, in an instance where the user, operator, or rider selects a specific or predetermined vehicle riding mode, illustrated process block 2206 may include such simultaneous dynamic adjusting of the vehicle attitude in response to the selected predetermined vehicle riding mode, the damping analysis, and the vehicle attitude analysis.

The computer-implemented method 2200 may terminate or end after execution of process block 2206.

Figure 23:
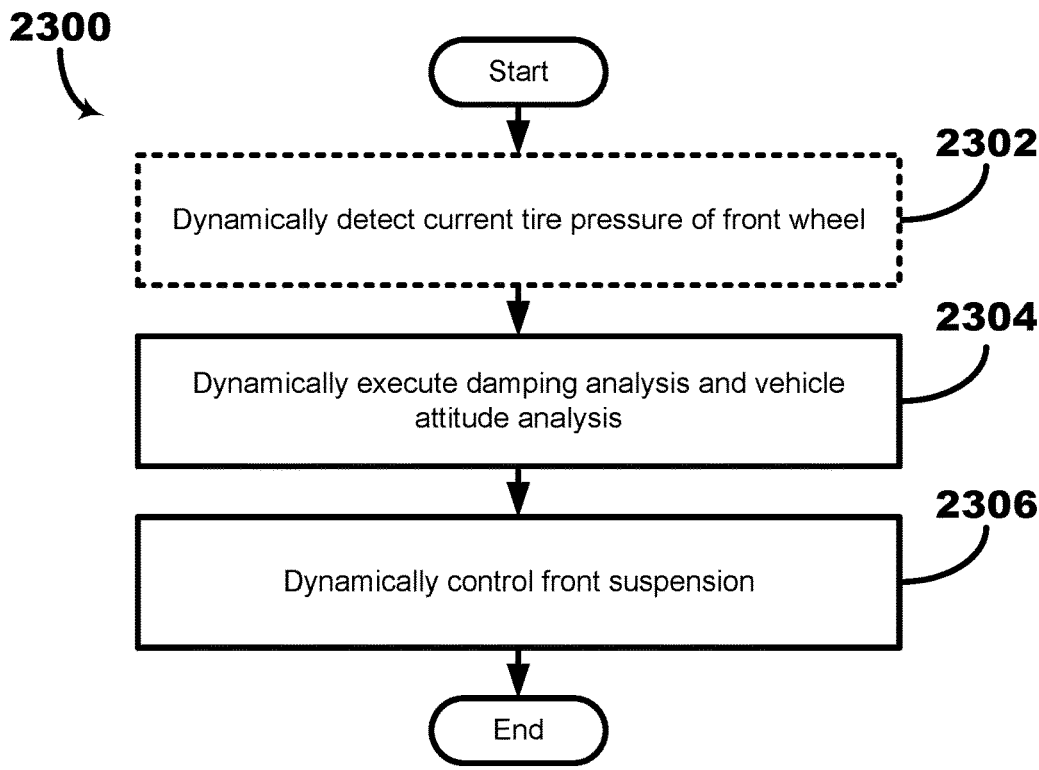

In the illustrated example computer-implemented method 2300 of FIG. 23, illustrated process block 2302 includes dynamically detecting a current tire pressure of the front wheel.

The computer-implemented method 2300 may then proceed to illustrated process block 2304, which includes dynamically executing, in response to the detection, a damping analysis and a vehicle attitude analysis.

The computer-implemented method 2300 may then proceed to illustrated process block 2306, which includes dynamically controlling the front suspension in response to the damping analysis and the vehicle attitude analysis.

Alternatively, or additionally, in an instance where the user, operator, or rider selects a specific or predetermined vehicle riding mode, illustrated process block 2306 may include such dynamic control of the front suspension in response to the selected predetermined vehicle riding mode, the damping analysis, and the vehicle attitude analysis.

The computer-implemented method 2300 may terminate or end after execution of process block 2306.

Figure 24:
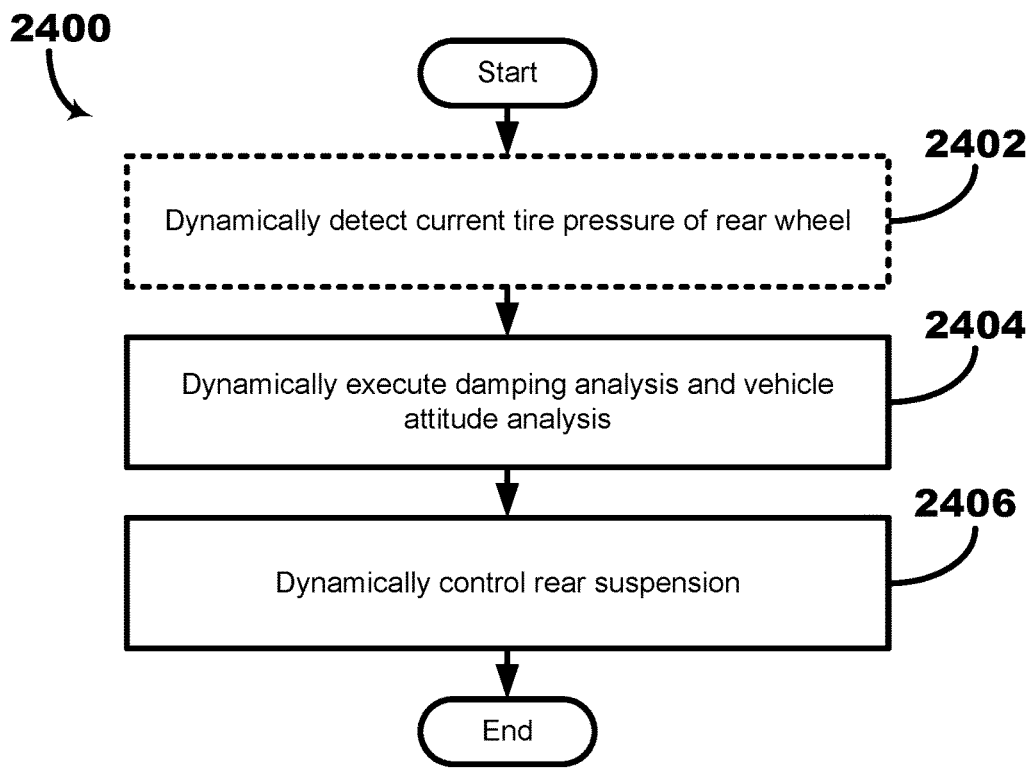

In the illustrated example computer-implemented method 2400 of FIG. 24, illustrated process block 2402 includes dynamically detecting a current tire pressure of the rear wheel.

The computer-implemented method 2400 may then proceed to illustrated process block 2404, which includes dynamically executing, in response to the detection, a damping analysis and a vehicle attitude analysis.

The computer-implemented method 2400 may then proceed to illustrated process block 2406, which includes dynamically controlling the rear suspension in response to the damping analysis and the vehicle attitude analysis. Alternatively, or additionally, in an instance where the user, operator, or rider selects a specific or predetermined vehicle riding mode, illustrated process block 2406 may include such dynamic control of the rear suspension in response to the selected predetermined vehicle riding mode, the damping analysis, and the vehicle attitude analysis.

The computer-implemented method 2400 may terminate or end after execution of process block 2406.

Figure 25:
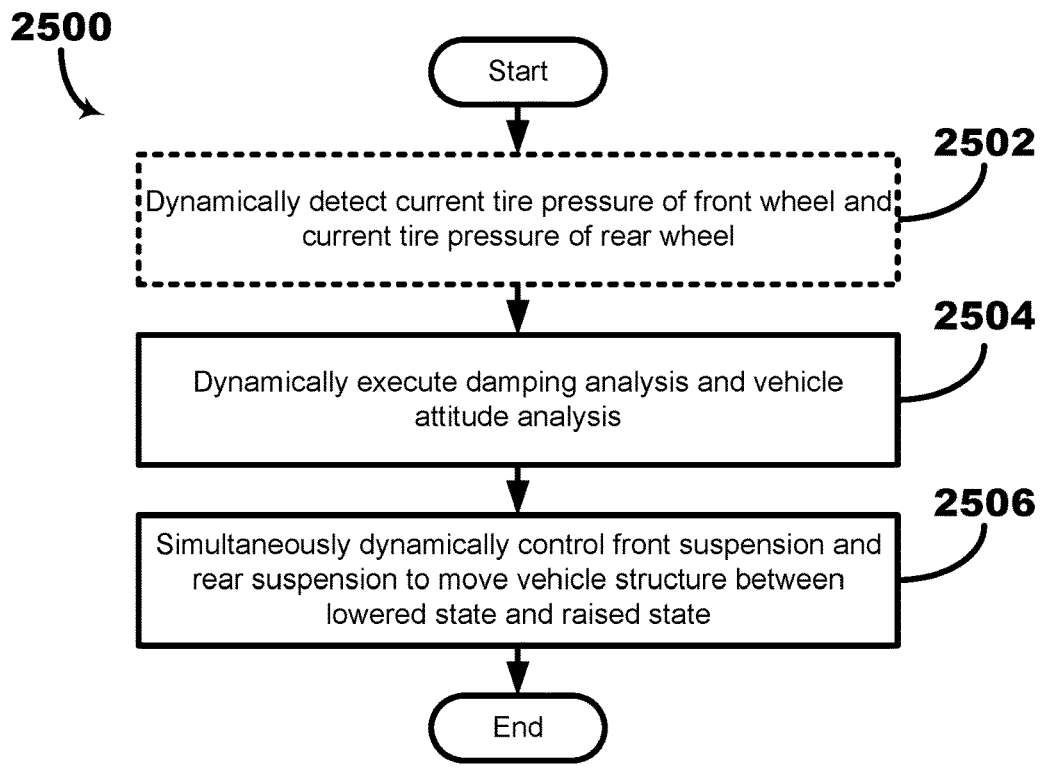

In the illustrated example computer-implemented method 2500 of FIG. 25, illustrated process block 2502 includes dynamically detecting a current tire pressure of the front wheel and a current tire pressure of the rear wheel.

The computer-implemented method 2500 may then proceed to illustrated process block 2504, which includes dynamically executing, in response to the detection, a damping analysis and a vehicle attitude analysis.

The computer-implemented method 2500 may then proceed to illustrated process block 2506, which includes simultaneously dynamically controlling, in response to the damping analysis and the vehicle attitude analysis, the front suspension and the rear suspension to move the vehicle structure between a lowered state and a raised state. Alternatively, or additionally, in an instance where the user, operator, or rider selects a specific or predetermined vehicle riding mode, illustrated process block 2506 may include such simultaneous dynamic control of the front suspension and the rear suspension in response to the selected predetermined vehicle riding mode, the damping analysis, and the vehicle attitude analysis.

The computer-implemented method 2500 may terminate or end after execution of process block 2506.

Figure 26:
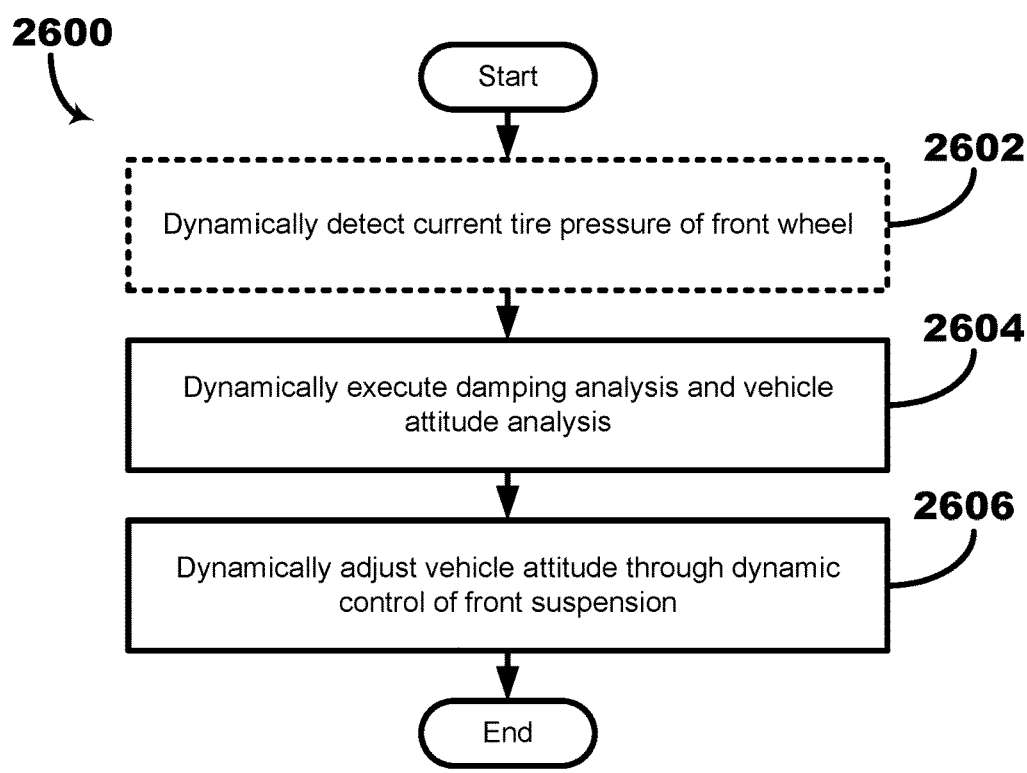

In the illustrated example computer-implemented method 2600 of FIG. 26, illustrated process block 2602 includes dynamically detecting a current tire pressure of the front wheel.

The computer-implemented method 2600 may then proceed to illustrated process block 2604, which includes dynamically executing, in response to the detection, a damping analysis and a vehicle attitude analysis.

The computer-implemented method 2600 may then proceed to illustrated process block 2606, which includes dynamically adjusting, in response to the damping analysis and the vehicle attitude analysis, the vehicle attitude through the dynamic control of the front suspension. Alternatively, or additionally, in an instance where the user, operator, or rider selects a specific or predetermined vehicle riding mode, illustrated process block 2606 may include such dynamic adjusting of the vehicle attitude in response to the selected predetermined vehicle riding mode, the damping analysis, and the vehicle attitude analysis. Alternatively, or additionally, in an instance where the user, operator, or rider selects a specific or predetermined vehicle riding mode, illustrated process block 2606 may include such dynamic control of the front suspension in response to the selected predetermined vehicle riding mode, the damping analysis, and the vehicle attitude analysis.

The computer-implemented method 2600 may terminate or end after execution of process block 2606.

Figure 27:
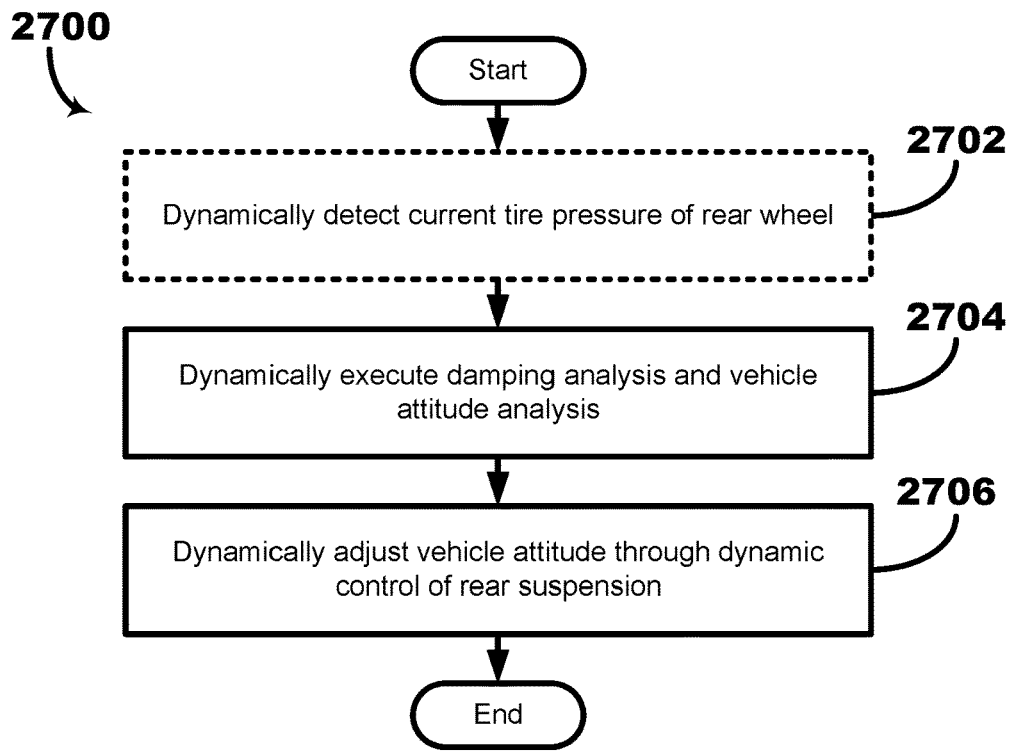

In the illustrated example computer-implemented method 2700 of FIG. 27, illustrated process block 2702 includes dynamically detecting a current tire pressure of the rear wheel.

The computer-implemented method 2700 may then proceed to illustrated process block 2704, which includes dynamically executing, in response to the detection, a damping analysis and a vehicle attitude analysis.

The computer-implemented method 2700 may then proceed to illustrated process block 2706, which includes dynamically adjusting, in response to the damping analysis and the vehicle attitude analysis, the vehicle attitude through the dynamic control of the rear suspension. Alternatively, or additionally, in an instance where the user, operator, or rider selects a specific or predetermined vehicle riding mode, illustrated process block 2706 may include such dynamic adjusting of the vehicle attitude in response to the selected predetermined vehicle riding mode, the damping analysis, and the vehicle attitude analysis.

The computer-implemented method 2700 may terminate or end after execution of process block 2706.

Figure 28:
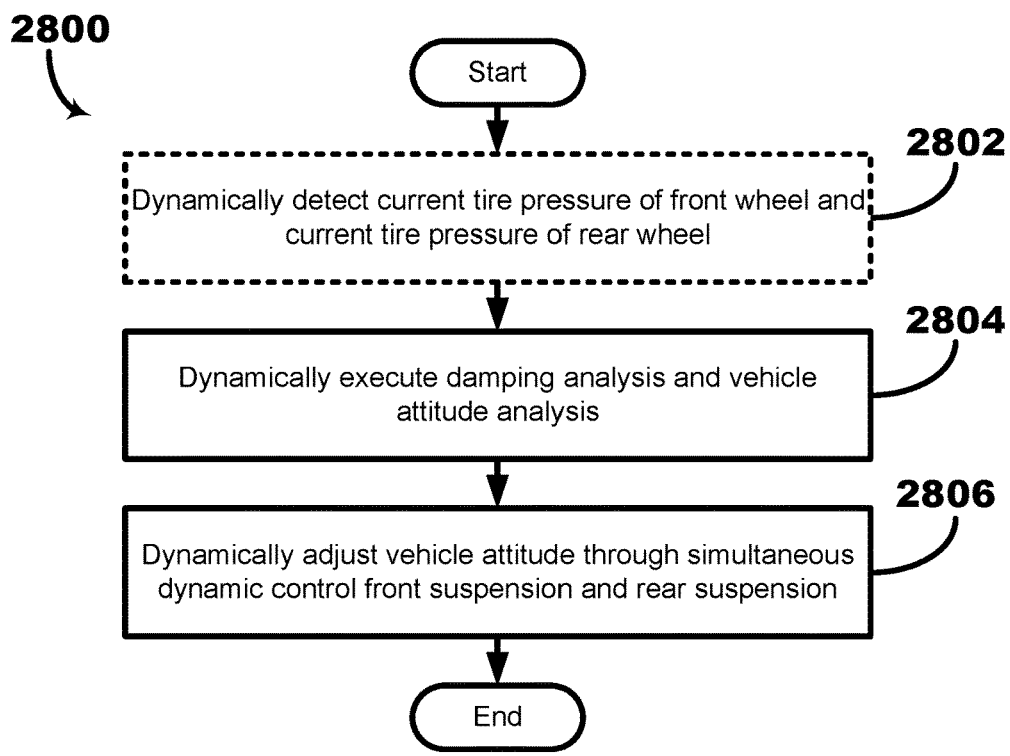

In the illustrated example computer-implemented method 2800 of FIG. 28, illustrated process block 2802 includes dynamically detecting a current tire pressure of the front wheel and a current tire pressure of the rear wheel.

The computer-implemented method 2800 may then proceed to illustrated process block 2804, which includes dynamically executing, in response to the detection, a damping analysis and a vehicle attitude analysis.

The computer-implemented method 2800 may then proceed to illustrated process block 2806, which includes simultaneously dynamically adjusting, in response to the damping analysis and the vehicle attitude analysis, the vehicle attitude through the simultaneous dynamic control of the front suspension and the rear suspension. Alternatively, or additionally, in an instance where the user, operator, or rider selects a specific or predetermined vehicle riding mode, illustrated process block 2806 may include such simultaneous dynamic adjusting of the vehicle attitude in response to the selected predetermined vehicle riding mode, the damping analysis, and the vehicle attitude analysis.

The computer-implemented method 2800 may terminate or end after execution of process block 2806.

Figure 29:
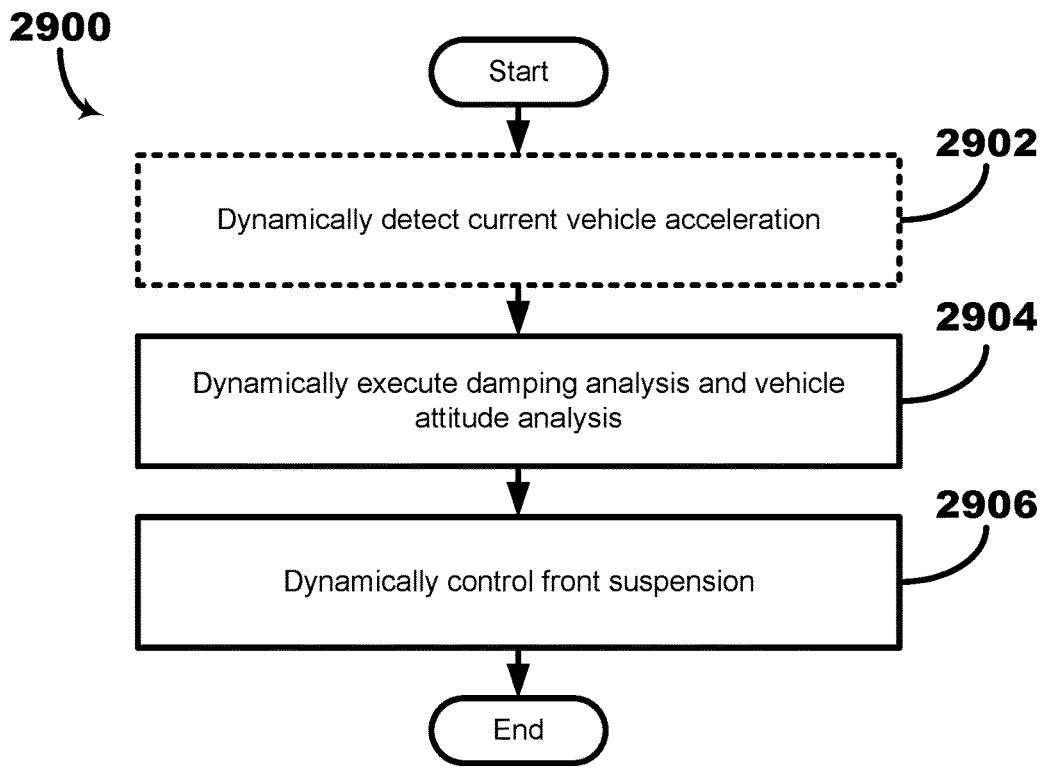

In the illustrated example computer-implemented method 2900 of FIG. 29, illustrated process block 2902 includes dynamically detecting a current vehicle acceleration.

The computer-implemented method 2900 may then proceed to illustrated process block 2904, which includes dynamically executing, in response to the detection, a damping analysis and a vehicle attitude analysis.

The computer-implemented method 2900 may then proceed to illustrated process block 2906, which includes dynamically controlling the front suspension in response to the damping analysis and the vehicle attitude analysis. Alternatively, or additionally, in an instance where the user, operator, or rider selects a specific or predetermined vehicle riding mode, illustrated process block 2906 may include such dynamic control of the front suspension in response to the selected predetermined vehicle riding mode, the damping analysis, and the vehicle attitude analysis.

The computer-implemented method 2900 may terminate or end after execution of process block 2906.

Figure 30:
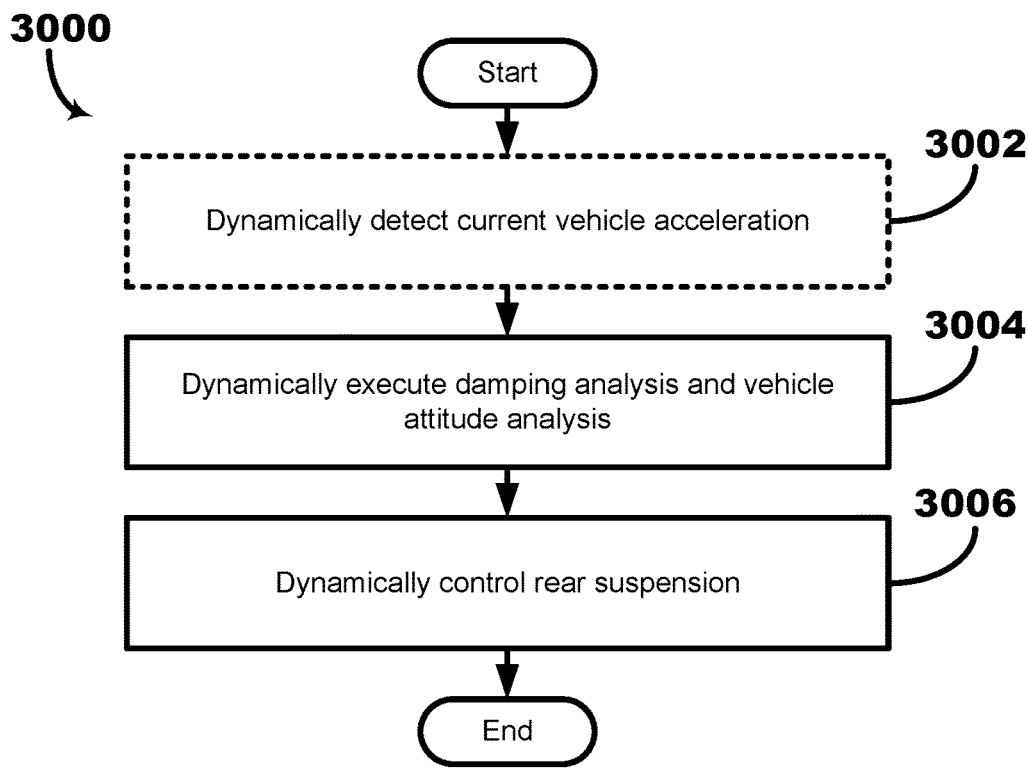

In the illustrated example computer-implemented method 3000 of FIG. 30, illustrated process block 3002 includes dynamically detecting a current vehicle acceleration.

The computer-implemented method 3000 may then proceed to illustrated process block 3004, which includes dynamically executing, in response to the detection, a damping analysis and a vehicle attitude analysis.

The computer-implemented method 3000 may then proceed to illustrated process block 3006, which includes dynamically controlling the rear suspension in response to the damping analysis and the vehicle attitude analysis. Alternatively, or additionally, in an instance where the user, operator, or rider selects a specific or predetermined vehicle riding mode, illustrated process block 3006 may include such dynamic control of the rear suspension in response to the selected predetermined vehicle riding mode, the damping analysis, and the vehicle attitude analysis.

The computer-implemented method 3000 may terminate or end after execution of process block 3006.

Figure 31:
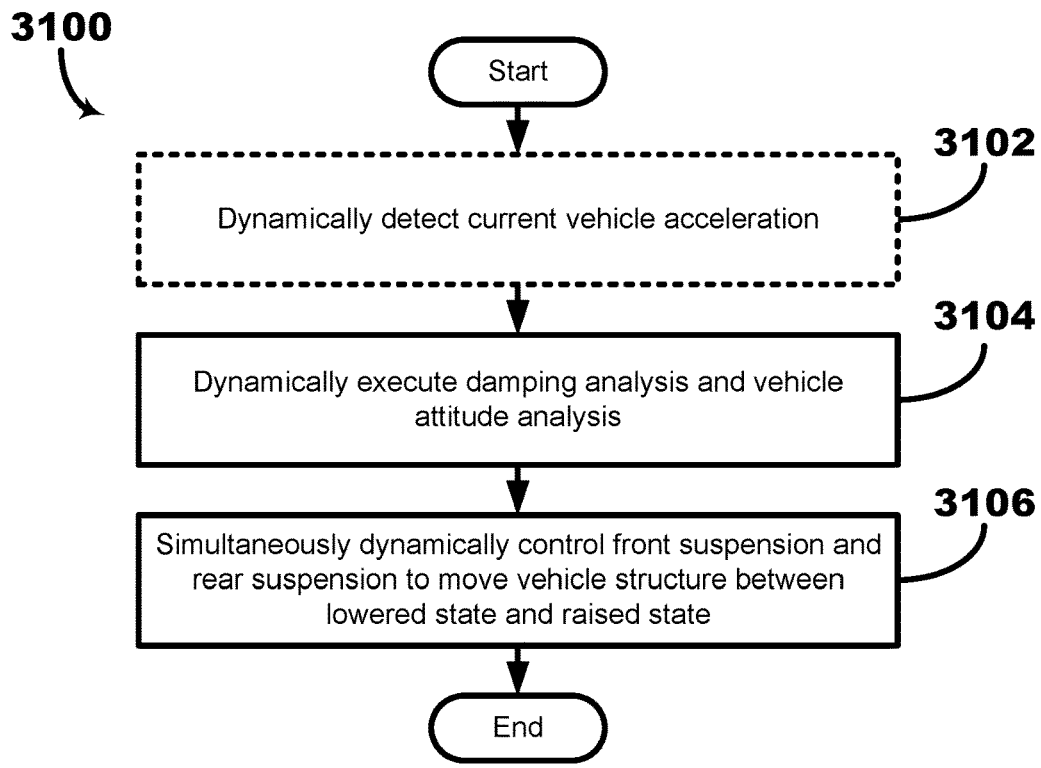

In the illustrated example computer-implemented method 3100 of FIG. 31, illustrated process block 3102 includes dynamically detecting a current vehicle acceleration.

The computer-implemented method 3100 may then proceed to illustrated process block 3104, which includes dynamically executing, in response to the detection, a damping analysis and a vehicle attitude analysis.

The computer-implemented method 3100 may then proceed to illustrated process block 3106, which includes simultaneously dynamically controlling, in response to the damping analysis and the vehicle attitude analysis, the front suspension and the rear suspension to move the vehicle structure between a lowered state and a raised state. Alternatively, or additionally, in an instance where the user, operator, or rider selects a specific or predetermined vehicle riding mode, illustrated process block 3106 may include such simultaneous dynamic control of the front suspension and the rear suspension in response to the selected predetermined vehicle riding mode, the damping analysis, and the vehicle attitude analysis.

The computer-implemented method 3100 may terminate or end after execution of process block 3106.

Figure 32:
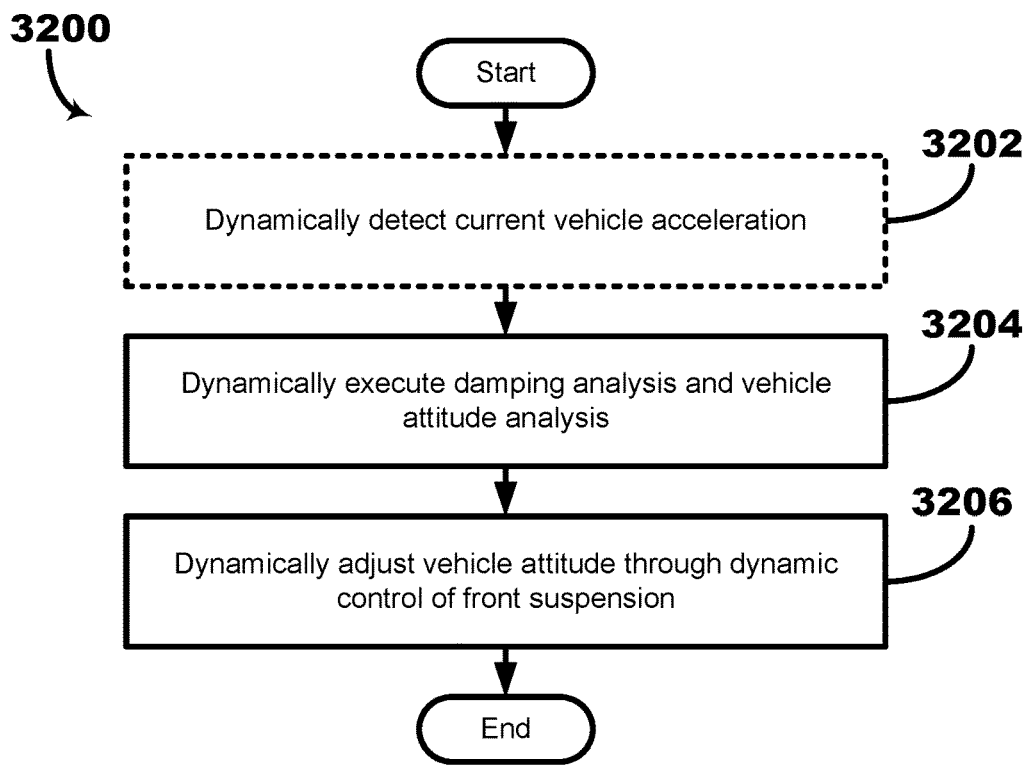

In the illustrated example computer-implemented method 3200 of FIG. 32, illustrated process block 3202 includes dynamically detecting a current vehicle acceleration.

The computer-implemented method 3200 may then proceed to illustrated process block 3204, which includes dynamically executing, in response to the detection, a damping analysis and a vehicle attitude analysis.

The computer-implemented method 3200 may then proceed to illustrated process block 3206, which includes dynamically adjusting, in response to the damping analysis and the vehicle attitude analysis, the vehicle attitude through the dynamic control of the front suspension. Alternatively, or additionally, in an instance where the user, operator, or rider selects a specific or predetermined vehicle riding mode, illustrated process block 3206 may include such dynamic adjusting of the vehicle attitude in response to the selected predetermined vehicle riding mode, the damping analysis, and the vehicle attitude analysis. Alternatively, or additionally, in an instance where the user, operator, or rider selects a specific or predetermined vehicle riding mode, illustrated process block 2606 may include such dynamic control of the front suspension in response to the selected predetermined vehicle riding mode, the damping analysis, and the vehicle attitude analysis.

The computer-implemented method 3200 may terminate or end after execution of process block 3206.

Figure 33:
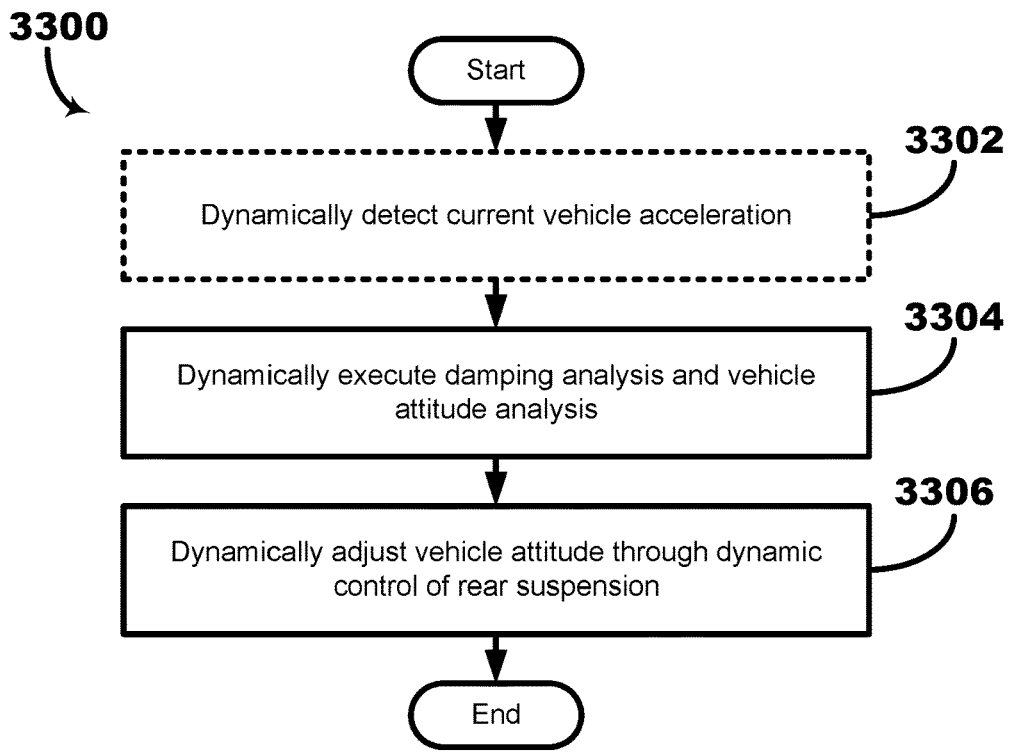

In the illustrated example computer-implemented method 3300 of FIG. 33, illustrated process block 3302 includes dynamically detecting a current vehicle acceleration.

The computer-implemented method 3300 may then proceed to illustrated process block 3304, which includes dynamically executing, in response to the detection, a damping analysis and a vehicle attitude analysis.

The computer-implemented method 3300 may then proceed to illustrated process block 3306, which includes dynamically adjusting, in response to the damping analysis and the vehicle attitude analysis, the vehicle attitude through the dynamic control of the rear suspension. Alternatively, or additionally, in an instance where the user, operator, or rider selects a specific or predetermined vehicle riding mode, illustrated process block 3306 may include such dynamic adjusting of the vehicle attitude in response to the selected predetermined vehicle riding mode, the damping analysis, and the vehicle attitude analysis.

The computer-implemented method 3300 may terminate or end after execution of process block 3306.

Figure 34:
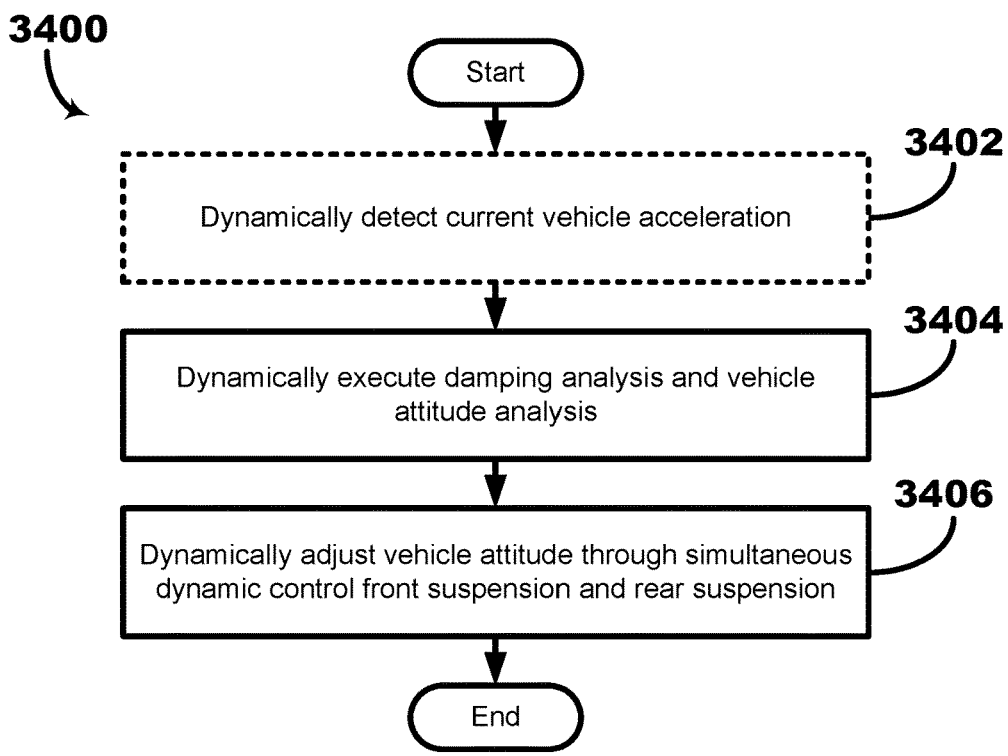

In the illustrated example computer-implemented method 3400 of FIG. 34, illustrated process block 3402 includes dynamically detecting a current vehicle acceleration.

The computer-implemented method 3400 may then proceed to illustrated process block 3404, which includes dynamically executing, in response to the detection, a damping analysis and a vehicle attitude analysis.

The computer-implemented method 3400 may then proceed to illustrated process block 3406, which includes simultaneously dynamically adjusting, in response to the damping analysis and the vehicle attitude analysis, the vehicle attitude through the simultaneous dynamic control of the front suspension and the rear suspension. Alternatively, or additionally, in an instance where the user, operator, or rider selects a specific or predetermined vehicle riding mode, illustrated process block 3406 may include such simultaneous dynamic adjusting of the vehicle attitude in response to the selected predetermined vehicle riding mode, the damping analysis, and the vehicle attitude analysis.

The computer-implemented method 3400 may terminate or end after execution of process block 3406.

The terms "coupled," "attached," or "connected" may be used herein to refer to any type of relationship, direct or indirect, between the components in question, and may apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the embodiments of the present disclosure may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A vehicle adaptive ride height system for a vehicle having a vehicle structure supported by a suspension system on a road surface, the vehicle adaptive ride height system comprising:
a vehicle adaptive ride height control module, comprising one or more processors to execute a set of instructions to dynamically:
execute a damping analysis and a vehicle attitude analysis of sensor data relating to operational parameters of the vehicle that comprise a current tire pressure of a front wheel of the vehicle and a current tire pressure of a rear wheel of the vehicle; and
simultaneously control, in response to the damping analysis and the vehicle attitude analysis of the sensor data, the front suspension and the rear suspension to cause movement of the vehicle structure, relative to the road surface, between a lowered state and a raised state.

2. The vehicle adaptive ride height system of claim 1, further comprising a sensor module, operatively connected to the vehicle adaptive ride height control module, the sensor module comprising one or more sensors to dynamically detect as the sensor data the operational parameters of the vehicle.

3. The vehicle adaptive ride height system of claim 1, wherein the operational parameters comprise one or more of:
a current position of a front suspension of the suspension system,
a current preload of the front suspension,
a current position of a rear suspension of the suspension system, and
a current preload of the rear suspension.

4. The vehicle adaptive ride height system of claim 1, wherein the operational parameters comprise one or more of a current vehicle speed and a current vehicle acceleration.

5. The vehicle adaptive ride height system of claim 1, wherein the operational parameters comprise one or more of a current applied torque on the front brake and a current applied torque on the rear brake.

6. The vehicle adaptive ride height system of claim 1, wherein the set of instructions cause the one or more processors to dynamically adjust, in response to the damping analysis and the vehicle attitude analysis, the vehicle attitude through the simultaneous control of the front suspension and the rear suspension.

7. A vehicle, comprising:
a vehicle structure;
a suspension system having a front suspension and a rear suspension operable to support the vehicle structure on a support surface; and
vehicle adaptive ride height system having a vehicle adaptive ride height control module, comprising one or more processors to execute a set of instructions to dynamically:
execute a damping analysis and a vehicle attitude analysis of sensor data relating to operational parameters of the vehicle that comprise a current tire pressure of a front wheel of the vehicle and a current tire pressure of a rear wheel of the vehicle; and
simultaneously control, in response to the damping analysis and the vehicle attitude analysis of the sensor data, the front suspension and the rear suspension to cause movement of the structure, relative to the road surface, between a lowered state and a raised state.

8. The vehicle of claim 7, further comprising a sensor module, operatively connected to the vehicle adaptive ride height control module, the sensor module comprising one or more sensors to dynamically detect as the sensor data the operational parameters of the vehicle.

9. The vehicle of claim 7, wherein the operational parameters comprise one or more of:
a current position of a front suspension of the suspension system,
a current preload of the front suspension,
a current position of a rear suspension of the suspension system, and
a current preload of the rear suspension.

10. The vehicle of claim 7, wherein the operational parameters comprise one or more of a current vehicle speed and a current vehicle acceleration.

11. The vehicle of claim 7, wherein the operational parameters comprise one or more of a current applied torque on the front brake and a current applied torque on the rear brake.

12. The vehicle of claim 7, wherein the set of instructions cause the one or more processors to dynamically adjust, in response to the damping analysis and the vehicle attitude analysis, the vehicle attitude through the simultaneous control of the front suspension and the rear suspension.

13. A computer-implemented method of controlling a vehicle having a vehicle structure supported by a suspension system on a road surface, the method comprising:
dynamically detecting as sensor data one or more operation parameters of the vehicle that comprise a current tire pressure of a front wheel of the vehicle and a current tire pressure of a rear wheel of the vehicle;
dynamically executing, in response to the detection, a damping analysis and a vehicle attitude analysis of the sensor data; and
dynamically simultaneously control, in response to the damping analysis and the vehicle attitude analysis of the sensor data, the front suspension and the rear suspension to cause movement of the vehicle structure, relative to the road surface, between a lowered state and a raised state.

14. The computer-implemented method of claim 13, wherein the operational parameters comprise one or more of:
a current position of a front suspension of the suspension system,
a current preload of the front suspension,
a current position of a rear suspension of the suspension system, and
a current preload of the rear suspension.

15. The computer-implemented method of claim 13, wherein the operational parameters comprise one or more of a current vehicle speed and a current vehicle acceleration.

16. The computer-implemented method of claim 13, wherein the operational parameters comprise one or more of a current applied torque on the front brake and a current applied torque on the rear brake.

17. The computer-implemented method of claim 13, further comprising dynamically adjusting, in response to the damping analysis and the vehicle attitude analysis, the vehicle attitude through the simultaneous control of the front suspension and the rear suspension.

* * * * *